US008596779B2

(12) United States Patent
Todoriki et al.

(10) Patent No.: US 8,596,779 B2
(45) Date of Patent: Dec. 3, 2013

(54) TRANSPORT APPARATUS AND RECORDING APPARATUS

(75) Inventors: Akio Todoriki, Azumino (JP); Koichi Saito, Matsumato (JP); Kenji Ozawa, Shiojiri (JP); Ryoji Uesugi, Matsumoto (JP); Katsunori Ono, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 203 days.

(21) Appl. No.: 13/042,037

(22) Filed: Mar. 7, 2011

(65) Prior Publication Data

US 2011/0221844 A1 Sep. 15, 2011

(30) Foreign Application Priority Data

Mar. 9, 2010 (JP) ................................ 2010-052316

(51) Int. Cl.

*B41J 2/01* (2006.01)
*B65G 13/02* (2006.01)
*B65G 13/00* (2006.01)

(52) U.S. Cl.

USPC .............................. 347/104; 193/37; 198/780

(58) Field of Classification Search

USPC ......... 347/104; 193/37; 198/780; 492/20, 18, 492/48, 53, 56, 59; 101/40, 232; 271/8.1; 399/384; 400/611; 29/895; 414/288
IPC ........................... B41J 2/01; B65G 13/00,13/02
See application file for complete search history.

(56) References Cited

U.S. PATENT DOCUMENTS

| | | | | |
|---|---|---|---|---|
| 3,994,380 | A * | 11/1976 | Hope et al. | 193/37 |
| 4,661,677 | A * | 4/1987 | La Rocca | 219/121.64 |
| 5,001,816 | A * | 3/1991 | Oetiker | 24/20 EE |
| 5,829,354 | A * | 11/1998 | Buckley | 101/483 |
| 6,016,846 | A * | 1/2000 | Knittel et al. | 138/128 |
| 2004/0140011 | A1* | 7/2004 | Kondou et al. | 138/167 |
| 2007/0070113 | A1* | 3/2007 | Kawabata et al. | 347/20 |
| 2008/0041254 | A1* | 2/2008 | Metrope | 101/375 |
| 2008/0121008 | A1 | 5/2008 | Yanokura et al. | |
| 2010/0206191 | A1* | 8/2010 | Saito et al. | 101/216 |
| 2010/0206687 | A1* | 8/2010 | Saito et al. | 193/37 |
| 2010/0209168 | A1* | 8/2010 | Saito et al. | 400/578 |
| 2010/0209170 | A1* | 8/2010 | Saito et al. | 400/636 |

FOREIGN PATENT DOCUMENTS

JP 2006-289496 10/2006

* cited by examiner

*Primary Examiner* — Manish S Shah
*Assistant Examiner* — Roger W Pisha, II
(74) *Attorney, Agent, or Firm* — Workman Nydegger

(57) ABSTRACT

Provided is a transport apparatus including: a transport roller which is formed in a cylindrical shape such that a pair of facing end portions of a metal sheet is close to each other or abuts on each other, which has a joint provided with a spot welding portion, and in which a high friction layer is formed on a surface thereof to transport a recording medium; and a support portion which supports a portion deviated from the high friction layer of the transport roller so that the transport roller rotates in the circumferential direction.

13 Claims, 29 Drawing Sheets

TRANSPORT APPARATUS AND RECORDING APPARATUS

The entire disclosure of Japanese Patent Application No: 2010-052316, filed Mar. 9, 2010 is expressly incorporated by reference herein.

BACKGROUND

1. Technical Field

The present invention relates to a transport apparatus and a recording apparatus.

2. Related Art

Both currently and in the past, a recording apparatus recording information on a sheet-like recording medium has been used. The recording apparatus includes a transport apparatus that transports the recording medium. The transport apparatus includes a transport roller which rotates to transport the recording medium and a driven roller which is biased to be brought into contact with the transport roller, and is adapted to transport the recording medium by nipping the recording medium between the transport roller and the driven roller. As the transport roller, a solid rod-like member is generally used. On the other hand, there is a problem in that the solid material increases the weight and the cost of the recording apparatus. Here, JP-2006-289496A discloses a technology of warping a metal sheet to have a cylindrical shape.

In a cylindrical shaft disclosed in Patent Document 1, the end surfaces of the metal sheet abut on each other when the metal sheet is warped to have a cylindrical shape. For this reason, a joint is formed between the pair of end surfaces of the metal sheet throughout the entire length of the cylindrical shaft.

However, when the transport roller including the cylindrical shaft with the above-described configuration is used, for example, there is a concern that the joint will be deformed to be opened due to a torque or the like during the rotational driving operation. In the event of such deformation, transportation precision may be degraded.

SUMMARY

An advantage of some aspects of the invention is that it provides a transport apparatus capable of suppressing degradation of transport precision and a recording apparatus having the same.

According to an aspect of the invention, there is provided a transport apparatus including: a transport roller which is formed in a cylindrical shape such that a pair of facing end portions of a metal sheet is close to each other or abuts on each other, which has a joint provided with a spot welding portion, and in which a high friction layer is formed on a surface thereof to transport a recording medium; and a support portion which supports a portion deviated from the high friction layer of the transport roller so that the transport roller rotates about the center axis thereof.

According to the transport apparatus, since the joint formed by the pair of facing end portions of the metal sheet is provided with the spot welding portion, the strength of the joint may be improved. Accordingly, deformation of the joint may be prevented. Further, in the transport apparatus, since the spot welding portion is provided instead of welding the entire joint, the transport apparatus may not be affected by internal stress generated when welding the entire joint. Accordingly, deformation of the transport roller may be prevented, so that a degradation of a transport precision may be prevented.

In the transport apparatus with such a configuration, the spot welding portion may be provided to be closer to the end portion of the rotation axis direction of the transport roller than the support portion.

According to the transport apparatus, since the spot welding portion is provided to be closer to the end portion of the rotation axis direction of the transport roller than the support portion, deformation of the end portion of the rotation axis direction of the transport roller may be prevented.

In the transport apparatus with such a configuration, the transport roller may have a connection portion which is formed at the end portion of the rotation axis direction to be connected to a rotation driving portion rotating the transport roller, and the spot welding portion may be provided in the vicinity of the connection portion.

According to the transport apparatus, the transport roller has the connection portion which is formed at the end portion in the rotation axis direction, and the spot welding portion is provided in the vicinity of the connection portion, thereby improving the strength of the driving transmission portion of the transport roller. Accordingly, deformation of the transport roller may be efficiently prevented.

In the transport apparatus with such a configuration, the spot welding portion may be provided between the support portion and the high friction layer.

According to the transport apparatus, since the spot welding portion is provided between the support portion and the high friction layer, for example, an foreign material may be prevented from intruding from the support portion to the high friction layer.

The transport apparatus with such a configuration further includes a driven roller which rotates accompanied by the rotation of the transport roller while pressing the transport roller and nips the recording medium between the transport roller and the driven roller, wherein the spot welding portion is provided in a portion deviated from a portion pressed by the driven roller in the transport roller.

According to the transport apparatus, since the spot welding portion is provided between the support portion and the high friction layer for example, a foreign material may be prevented from intruding from the support portion to the high friction layer.

In the transport apparatus with such a configuration, the pair of end portions forming the joint may have an uneven portion which allows one end portion and the other end portion of the pair of end portions to be fitted to each other, and the spot welding portion may be provided in the uneven portion.

According to the transport apparatus, the pair of end portions forming the joint has an uneven portion which allows one end portion and the other end portion of the pair of end portions to be fitted to each other, and the spot welding portion is provided in the uneven portion, thereby preventing deformation of the uneven portion.

In the transport apparatus with such a configuration, the uneven portion may have a first side which is formed along the rotation axis direction of the transport roller, and the spot welding portion may be provided in the first side.

According to the transport apparatus, the uneven portion has the first side which is formed along the rotation axis direction of the transport roller, and the spot welding portion is provided in the first side, thereby improving the strength of the uneven portion with respect to the circumferential direction of the transport roller. Accordingly, for example, deformation making the uneven portion be opened may be prevented.

In the transport apparatus with such a configuration, the uneven portion may have a second side which is formed along the circumferential direction of the transport roller, and the spot welding portion may be provided in the second side.

According to the transport apparatus, the uneven portion has a second side which is formed along the circumferential direction of the transport roller, and the spot welding portion is provided in the second side, thereby easily performing a positioning operation when performing the spot welding process. Accordingly, the precision of the spot welding formation position may be improved.

In the transport apparatus with such a configuration, the joint may be provided with a linear portion which is connected to the uneven portion, and the spot welding portion may be provided at a boundary portion between the linear portion and the uneven portion.

According to the transport apparatus, the joint is provided with a linear portion which is connected to the uneven portion, and the spot welding portion is provided at a boundary portion between the linear portion and the uneven portion, thereby improving the strength of the portion where a force easily concentrates in the joint.

In the transport apparatus with such a configuration, the uneven portion may be disposed to be closer to the end portion of the rotation axis direction of the transport roller than the support portion.

According to the transport apparatus, the uneven portion is disposed to be closer to the end portion of the rotation axis direction of the transport roller than the support portion, thereby improving the strength of the transport roller.

In the transport apparatus with such a configuration, the spot welding portion may be a portion which is formed by fusing a part of the metal sheet.

According to the transport apparatus, the spot welding portion is a portion which is formed by fusing a part of the metal sheet, so that the spot welding portion and the metal sheet are formed of the same material. Likewise, when the spot welding portion and the metal sheet are formed of the same material, for example, a difference in the thermal expansion coefficient in the spot welding portion may be prevented. Accordingly, deformation or the like caused by a thermal variation may be prevented.

In the transport apparatus with such a configuration, the spot welding portion may be a portion which is fused by emitting a laser beam to a part of the metal sheet.

According to the transport apparatus, the spot welding portion is a portion which is fused by emitting a laser beam to a part of the metal sheet, thereby easily forming the spot welding portion.

According to another aspect of the invention, there is provided a recording apparatus including: a transport unit which uses the transport apparatus according to the aspect of the invention to transport a recording medium; and a recording unit which performs a recording process on the recording medium transported by the transport apparatus.

According to the recording apparatus with such a configuration, a recording process may be performed on the recording medium while the recording medium is transported by the transport apparatus having highly precise transport precision, thereby performing the highly-precise recording process.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an exemplary embodiment of the invention will be described by referring to the accompanying drawings.

Furthermore, in the respective drawings to be described below, the scales of the respective members are appropriately changed so that the respective members are recognizable.

Figure 1:
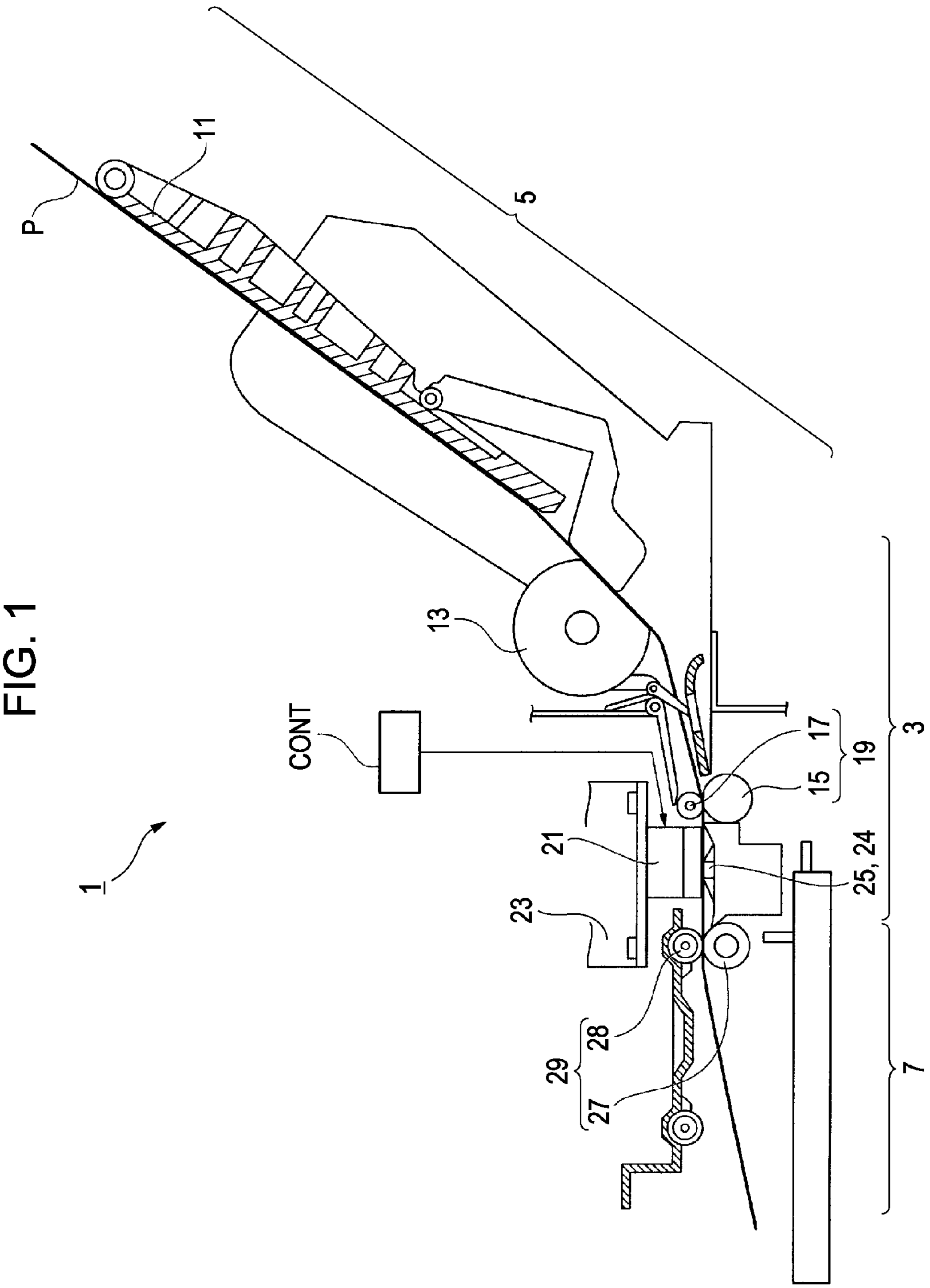
FIG. 1 is a side cross-sectional view illustrating an ink jet printer according to the invention.

FIG. 1 is a side cross-sectional view illustrating an ink jet printer according to the embodiment of the invention.

Figure 2B:
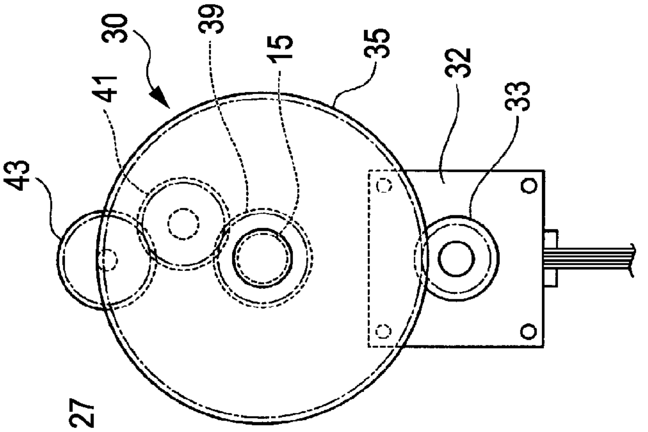
FIG. 2B is a side view illustrating a driving system.
Figure 2A:
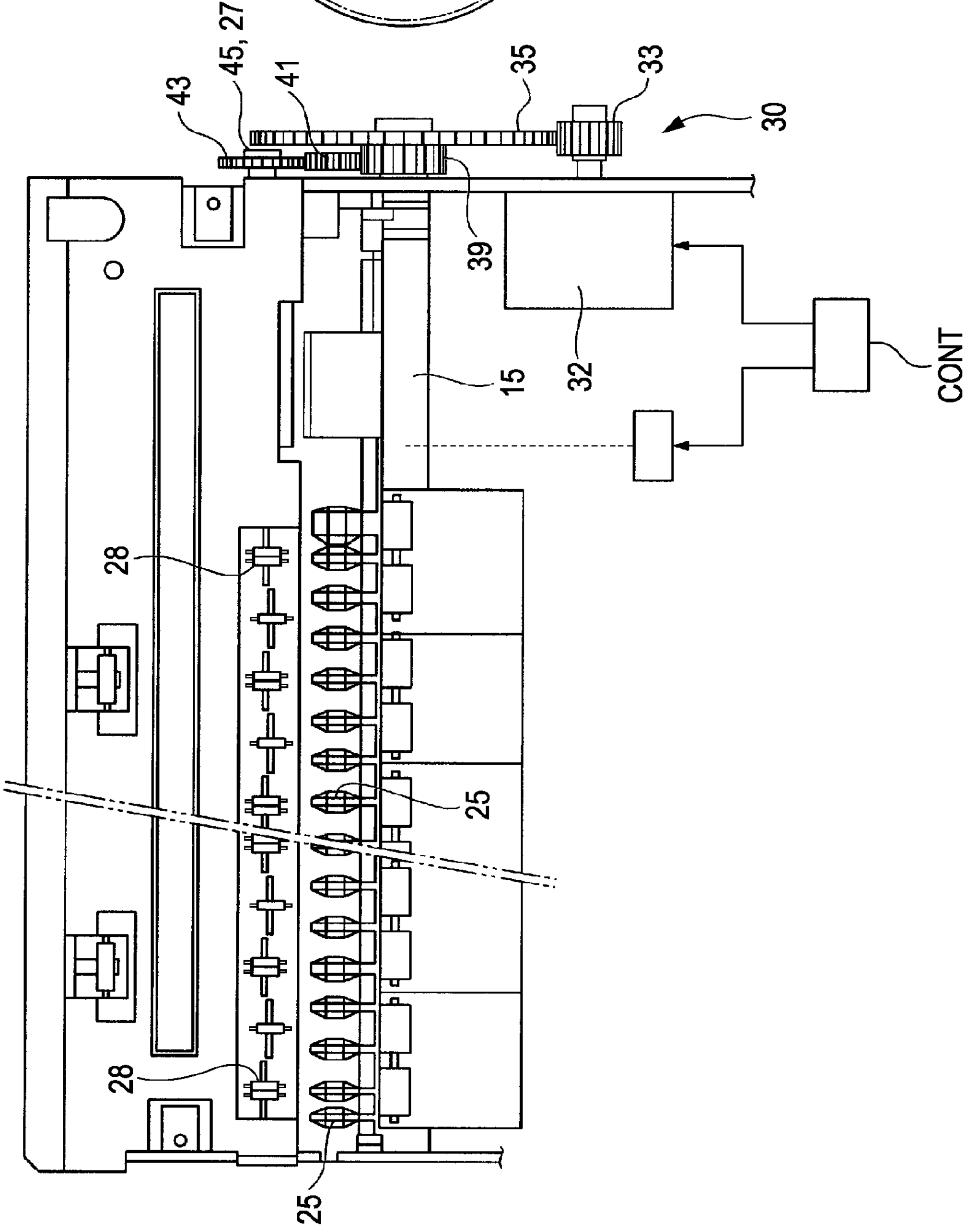
FIG. 2A is a partially plan view illustrating a transport unit.

FIG. 2A is a plan view illustrating a transport unit of the ink jet printer, and FIG. 2B is a side view illustrating a driving system of the transport unit.

As shown in FIG. 1, an ink jet printer (recording apparatus) 1 includes a printer body 3, a sheet feeding unit which is provided at the rear and upper side of the printer body 3, and a sheet discharging unit 7 which is provided at the front side of the printer body 3.

A sheet feeding unit 5 is provided with a sheet feeding tray 11, and the sheet feeding tray 11 is used to stack plural sheets (a medium, a recording medium, and a transport medium) P. Here, as the sheet P, a normal sheet, a coated sheet, a sheet for an OHP (overhead projector), a glossy sheet, a glossy film, and the like are used. Hereinafter, in the transport path of the sheet P, the side of the sheet feeding tray 11 is set as the upstream side, and the side of the sheet discharging unit 7 is set as the downstream side. A sheet feeding roller 13 is provided at the downstream side of the sheet feeding tray 11.

The sheet feeding roller 13 is adapted to nip the sheet P located at the uppermost portion of the sheet feeding tray 11 in a manner such that the sheet is nipped between the sheet feeding roller and a separation pad (not shown) facing the roller, and sends the sheet to the downstream side. A transport roller mechanism 19 is provided at the downstream side of the sheet feeding roller 13.

The transport roller mechanism 19 includes a transport roller 15 which is disposed at the lower side and a driven roller 17 which is disposed at the upper side.

The transport roller 15 is adapted to be rotationally driven by a driving unit 30 shown in FIGS. 2A and 2B while the sheet P is nipped between the driven roller 17 and the transport roller 15. Accordingly, the transport roller 15 is able to transport the sheet P to a recording head (a recording unit) 21 disposed at the downstream side through a precise and accurate transport (sheet feeding) operation in accordance with a transport printing process.

The recording head 21 is held by a carriage 23, and the carriage 23 is adapted to move in a reciprocating manner in the direction perpendicular to the sheet feeding direction (the transport direction of the sheet P). The recording process (the printing process) performed by the recording head 21 is designed to be controlled by a control unit CONT. A platen 24 is disposed at a position facing the recording head 21.

The platen 24 includes plural diamond ribs 25 which are arranged in the movement direction of the carriage 23 at the interval therebetween.

The diamond ribs 25 are used to support the sheet P from the lower side thereof when the recording head 21 records an image on the sheet P, and each front surface thereof serves as a support surface. The distance between the diamond rib 25 and the recording head 21 is designed to be adjusted in accordance with the thickness of the sheet P. Accordingly, the sheet P may pass on a top surface of the diamond rib 25. A sheet discharging roller mechanism 29 is provided at the downstream side of the diamond rib 25 and the recording head 21.

The sheet discharging roller mechanism 29 includes a sheet discharging roller 27 which is disposed at the lower side and a sheet discharging knurled roller 28 which is disposed at the upper side. Accordingly, the sheet P is drawn out and discharged in accordance with the rotational driving operation of the sheet discharging roller 27.

Here, the relationship between the driving unit 30 of the transport roller mechanism 19 and the sheet discharging roller mechanism 29 and the driving speed of the transport roller 15 and the sheet discharging roller 27 will be described.

As shown in FIGS. 2A and 2B, the printer body 3 includes a transport motor 32 which is driven under the control of the control unit CONT. A pinion 33 is provided at the driving axis of the transport motor 32, a transport driving gear 35 meshes with the pinion 33, and the transport roller 15 is inserted into the transport driving gear 35.

With such a configuration, the transport motor 32 and the like constitute the driving unit 30 which rotationally drives the transport roller 15.

Further, the transport roller 15 is provided with the transport driving gear 35 and an inner gear 39 which is coaxially formed therewith, an intermediate gear 41 meshes with the inner gear 39, and a sheet discharging driving gear 43 meshes with the intermediate gear 41. As shown in FIG. 2A, the rotation shaft of the sheet discharging driving gear 43 serves as a shaft body 45 of the sheet discharging roller 27.

With such a configuration, the transport roller 15 of the transport roller mechanism 19 and the sheet discharging roller 27 of the sheet discharging roller mechanism 29 are adapted to be driven by receiving a rotational driving force from the transport motor 32 as the same driving source.

Furthermore, the rotation speed of the sheet discharging roller 27 is set to be faster than the rotation speed of the transport roller 15 by adjusting the gear ratio between the respective gears. Accordingly, the sheet discharging speed of the sheet discharging roller mechanism 29 becomes faster than the transport speed of the transport roller mechanism 19 by an increase in the speed.

Further, the nipping force (pressing force) applied to the sheet P from the transport roller mechanism 19 is set to be larger than the nipping force (pressing force) of the sheet discharging roller mechanism 29. Accordingly, when the transport roller mechanism 19 and the sheet discharging roller mechanism 29 simultaneously nip the sheet P, the sheet transport speed is set as the transport speed of the transport roller mechanism 19 regardless of the sheet discharging speed of the sheet discharging roller mechanism 29.

Next, the transport roller 15 and the transport roller mechanism 19 having the same will be described.

Figure 3A:
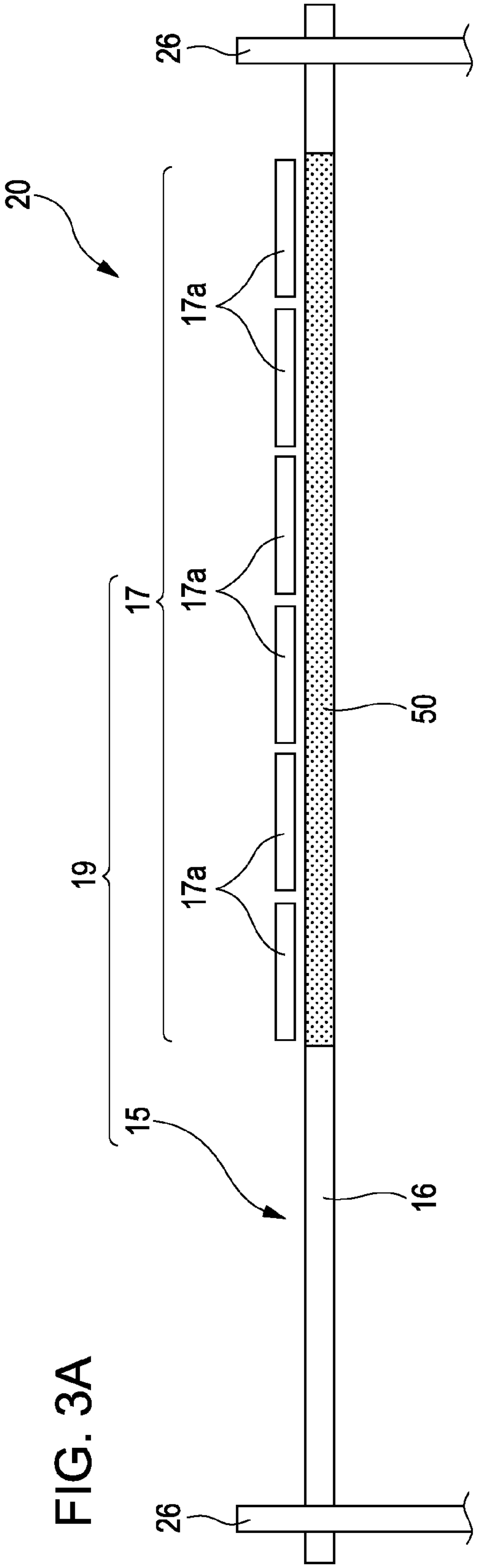
FIGS. 3A to 3C are schematic configuration diagrams illustrating a transport roller mechanism.
Figure 3C:
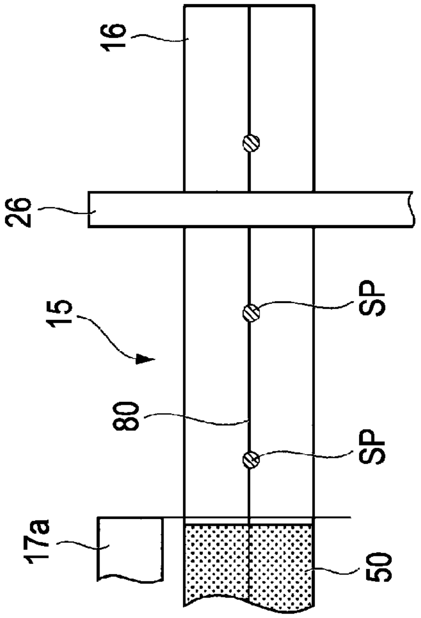
Figure 3B:
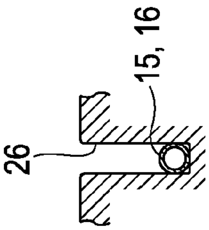

FIG. 3A is a diagram illustrating the schematic configuration of the transport roller mechanism 19, and FIG. 3B is a diagram illustrating the schematic configuration of the bearing.

The transport roller 15 includes a roller body 16 which is formed in a hollow cylindrical shape and a high friction layer 50 which is formed on a part of the surface of the roller body 16 in the length direction (the axial direction).

For example, the roller body 16 is formed from a base material which is a steel sheet coil obtained by winding a metal sheet such as a zinc plating steel sheet or a stainless steel sheet. The roller body 16 is a cylindrical shaft which is formed in a manner such that the uncoiled metal sheet is bent so that a pair of end surfaces faces each other, and an inner peripheral side surface of a coil is used as an inner peripheral surface. That is, the metal sheet forming the roller body 16 is formed in a cylindrical shape while a winding tendency of a coil is left so as to be warped toward the inner peripheral surface of the cylinder.

Figure 10A:
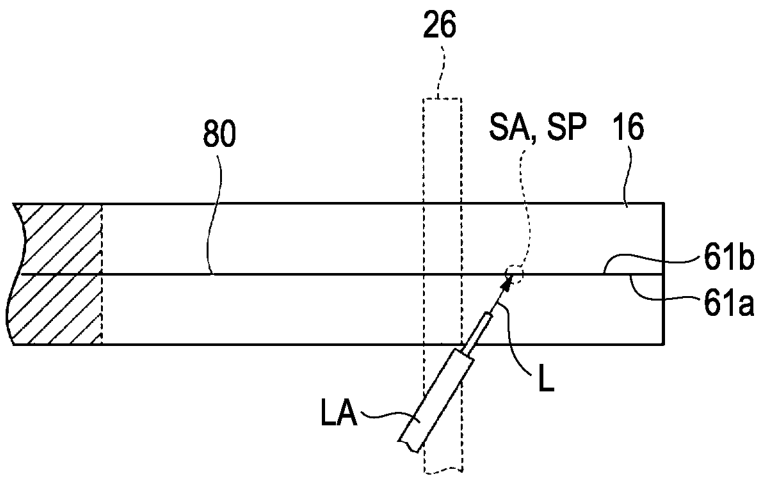
FIG. 10A is a diagram illustrating a spot welding process.
Figure 10B:
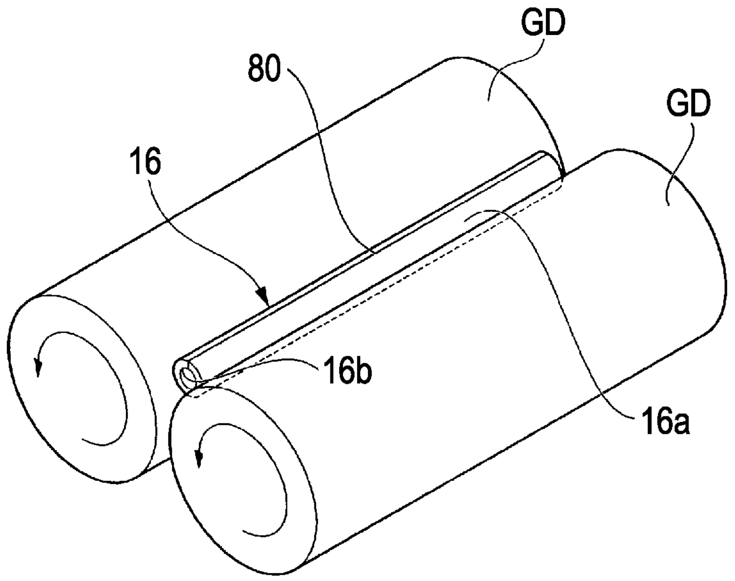
FIG. 10B is a diagram illustrating a centerless grinding process.

Further, as shown in FIGS. 10A and 10B, the roller body 16 includes a joint 80 which is formed between a pair of end surfaces 61*a* and 61*b* abutting on each other after the warping. Furthermore, the roller body 16 of the embodiment is formed such that the circumferential direction (the warping direction) is equal to the winding direction of the coil (the rolling direction of the metal sheet), and the joint 80 is formed to be substantially parallel to the axial direction of the roller body 16.

As shown in FIG. 3A, the high friction layer 50 is selectively formed at the center portion except for both end portions of the roller body 16. Sharp and acute portions of inorganic particles are fixed to the surface of the high friction layer 50 while being exposed therefrom, thereby exhibiting a high friction force.

The high friction layer 50 is formed in a manner such that a resinous film is formed by selectively coating resinous particles at a high friction layer forming area on the surface of the roller body 16 so that the film thickness becomes uniform such as to be from about 10 μm to 30 μm, and inorganic particles are uniformly sprayed and baked on the resinous film. As the resinous particles, for example, a fine particle having a diameter of about 10 to 20 μm and formed of an epoxy resin or a polyester resin is preferably used. Further, as an inorganic particle, a ceramic particle such as aluminum oxide (alumina; $Al_2O_3$), silicon carbide (SiC), or silicon dioxide ($SiO_2$) with a predetermined particle diameter distribution obtained through a crushing process is preferably used.

As shown in FIG. 3A, both end portions of the transport roller 15 are rotatably supported to a bearing 26 that is integrally formed with a platen 24 (refer to FIG. 1). As shown in FIG. 3B, the bearing 26 is formed in a U-shape which is opened upward, and the transport roller 15 is fitted to the U-shaped portion, so that the transport roller 15 is axially supported from three directions at the front and rear sides and the lower side. Then, lubricating oil (lubricating liquid) such as grease is supplied (applied) to a contact surface between the bearing 26 and the transport roller 15 (the surface of the transport roller 15). Further, one end or both ends of the transport roller 15 are provided with an engagement portion (not shown) so that the inner gear 39 or the transport driving gear 35 engage therewith so as not to be rotatable. The transport roller 15 may have various engagement portions so that various components are connected thereto.

The driven roller 17 is formed in a manner such that plural (for example, six) rollers 17*a* are coaxially arranged, and is disposed at a position facing and coming into contact with the high friction layer 50 of the transport roller 15. A biasing spring (not shown) is attached to the driven roller 17 including the rollers 17*a*, whereby the driven roller 17 is biased toward the transport roller 15.

Accordingly, the driven roller 17 contacts the high friction layer 50 of the transport roller 15 with a predetermined pressing force (a nipping force with respect to the sheet P), and is adapted to rotate in a manner of following the rotation of the transport roller 15. Further, a force nipping the sheet P between the transport roller 15 and the driven roller 17 becomes larger, so that the transport performance of the sheet P becomes satisfactory. Furthermore, the surface of each roller 17*a* of the driven roller 17 is subjected to, for example, a low-abrasion treatment such as coating of fluororesin in order to alleviate damage caused by contact with respect to the high friction layer 50.

In the embodiment, as shown in FIG. 3C, the roller body 16 has a spot welding portion SP which is formed at the joint 80. The spot welding portion SP is formed in a manner such that a part of the roller body 16 (the metal sheet) is fused by emitting a laser beam thereto. Of course, the spot welding portion SP may be formed by a method other than the emission of the laser beam.

The spot welding portion SP is a welding portion that is formed at a part of the joint 80 differently from the welding performed on the entire joint 80. FIG. 3C shows a case in which the spot welding portion is formed in a substantially circular area, but the shape thereof is not limited thereto. For example, the spot welding portion may be formed in an area which is slightly expanded in the direction of forming the joint 80 (for example, an oval shape or the like).

The spot welding portion SP is formed at, for example, plural positions in the joint 80. For example, as shown in FIG. 3C, the spot welding portion SP is formed at the position closer to the end portion in the rotation axis direction of the roller body 16 than the position supported by the bearing 26 in the roller body 16. Further, the spot welding portion SP is also provided at the position between the position supported by the bearing 26 and the position provided with the high friction layer 50. Furthermore, FIG. 3C shows only one end portion of both end portions of the roller body 16, and the other end portion is also provided with the spot welding portion SP. Further, the spot welding portion SP may be disposed in the vicinity of the portion where the transport driving gear 35 and the inner gear 39 are connected to each other in the roller body 16.

When the spot welding portion SP is disposed to be closer to the high friction layer 50 than the bearing 26, it is desirable that the spot welding portion is disposed at a portion pressed by, for example, the driven roller 17.

By using the transport roller 15, the bearing 26, the driving unit 30, the driven roller 17, and the like, the transport unit (the transport apparatus) 20 of the ink jet printer 1 is formed.

Next, the operation of the ink jet printer 1 will be described by referring to FIGS. 1A to 2B.

The ink jet printer 1 nips the sheet P located at the uppermost portion of the sheet feeding tray 11 by using the sheet feeding roller 13, and sends the sheet to the downstream side. The sent sheet P arrives at the transport roller mechanism 19. The transport roller mechanism 19 nips the sheet P between the transport roller 15 and the driven roller 17, and transports the sheet at a constant speed toward the lower side of the recording head 21 in accordance with the sheet feeding operation performed by the rotational driving operation of the transport roller 15. The sheet P transported to the lower side of the recording head 21 smoothly passes on the top surface of the diamond rib 25, and at this time, the recording head 21 records a high-quality image thereon. The sheet P having an image recorded by the recording head 21 is sequentially discharged by the sheet discharging roller 27 of the sheet discharging unit 7.

Since the transport speed of the sheet discharging roller mechanism 29 is set to be faster than the transport speed of the transport roller mechanism 19, the sheet P is transported with a back tension applied thereto. However, when the transport roller mechanism 19 and the sheet discharging roller mechanism 29 both nip the sheet P, the sheet transport speed is set as the transport speed of the transport roller mechanism 19. Accordingly, in this manner, even when the sheet is simultaneously discharged and transported by the sheet discharging roller mechanism 29 and the transport roller mechanism 19, the sheet transport speed is set as the transport speed of the transport roller mechanism 19. For this reason, the sheet is accurately and reliably transported without any irregularity in transport.

Here, when the sheet P is transported while being supported by the high friction layer 50 of the transport roller 15, a torque acts on the roller body 16. Then, a stress acts in the direction in which the joint 80 (refer to FIGS. 8A to 8C) of the pair of end surfaces 61*a* and 61*b* forming the roller body 16 is opened. When the joint 80 of the roller body 16 is opened, the transport roller 15 does not evenly contact the sheet P, so that irregularity in transport occurs.

However, in the embodiment, the roller body 16 of the transport roller 15 is formed by a metal sheet having a winding tendency of a steel sheet coil, and is formed in a cylindrical shape of which the inner peripheral surface is the inner peripheral side of the coil. The winding tendency of the metal sheet caused by the steel sheet coil indicates the warping in which the inner peripheral surface of the steel sheet coil becomes a concave surface. That is, the metal sheet forming the roller body 16 has a winding tendency that causes a warping so that the inner peripheral surface side of the roller body 16 is warped.

For this reason, a winding tendency does not act in the direction in which at least the joint of the roller body 16 is opened. Accordingly, compared to the case where a winding tendency is left so that the outer peripheral surface side of the roller body 16 is warped, the joint of the roller body 16 may be made to be difficult to open. That is, according to the embodiment, even when a stress acts in the direction in which the joint of the roller body 16 is opened, the joint may be prevented from being opened, thereby providing the transport roller 15 having high transport precision.

Further, the circumferential direction (the warping direction) of the roller body 16 is set to be equal to the winding direction (the rolling direction of the steel sheet) of the steel sheet coil. For this reason, the warping direction of the metal sheet forming the roller body 16 may be made equal to the warping direction of the winding tendency. Accordingly, the winding tendency of the metal sheet forming the roller body 16 acts in the direction in which the joint of the roller body 16 is closed. Accordingly, the joint of the roller body 16 may be more effectively prevented from being opened.

Further, since the roller body 16 is formed by a hollow cylindrical shaft, the weight may be greatly reduced compared to the case of using a solid shaft. Further, a demand for cutting the material is reduced compared to the case of forming the roller body 16 by a solid shaft. Accordingly, as the material of the roller body 16, a material without a toxic substance such as lead may be used, thereby reducing an environmental burden.

Further, the transport roller 15 is provided with the high friction layer 50, and the driven roller 17 is disposed at a position coming into contact with the high friction layer 50. For this reason, a force nipping the sheet P between the transport roller 15 and the driven roller 17 becomes larger, so that the sheet P may be more satisfactorily transported.

Further, the transport unit 20 of the embodiment includes the transport roller 15 and the bearing 26 supporting the bearing. For this reason, the transport roller 15 having high transport precision as described above may be rotated while being supported by the bearing 26, and the sheet P may be highly precisely transported while being supported by the high friction layer 50. Further, since the transport roller 15 is formed by the hollow roller body 16, the weight of the transport unit 20 may be greatly reduced compared to the case of using the solid shaft, and the environmental burden may be reduced.

Further, the ink jet printer 1 of the embodiment may highly precisely transport the sheet P by using the transport unit 20, and perform a highly precise recording process on the sheet P. Further, since the transport roller 15 is formed by the hollow roller body 16, the weight of the entire apparatus may be greatly reduced compared to the case of using the solid shaft, and the environmental load may be reduced.

Next, a device for manufacturing the transport roller 15 will be described.

Figure 4:
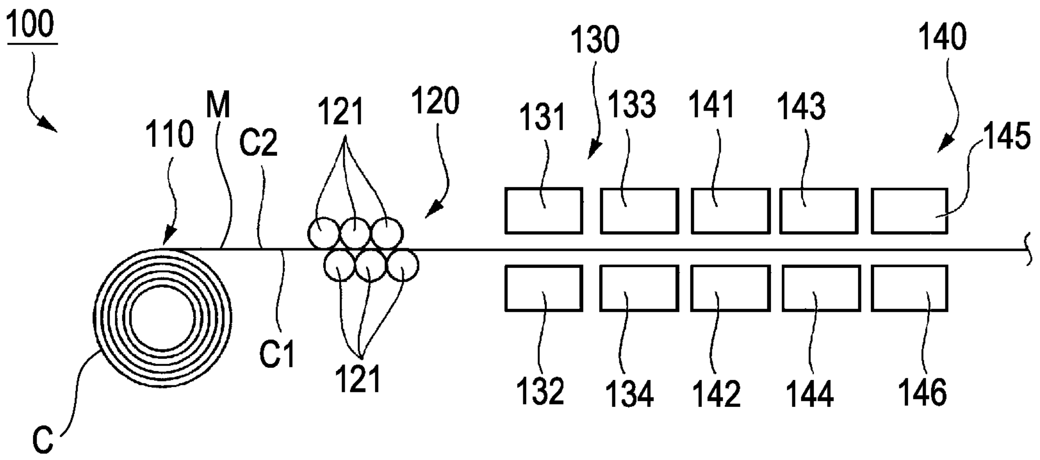
FIG. 4 is a schematic configuration diagram illustrating a device that manufactures a transport roller according to the embodiment.

FIG. 4 is a schematic diagram illustrating the transport roller 15 of the embodiment.

As shown in FIG. 4, the device 100 includes an uncoiler 110, a leveler 120, a first press machine 130, and a second press machine 140 which are disposed in one direction. Further, the device 100 includes a transport unit (not shown) which transports a metal sheet M uncoiled from the coil C in one direction and a cutting unit (not shown) which separates the processed cylindrical shaft from the metal sheet M.

The uncoiler 110 is used to support a cylindrical coil (steel sheet coil) C in which the metal sheet M is wound in the rolling direction to be rotatable about the axis thereof and to uncoil the coil C.

The leveler 120 includes plural upper and lower work rolls 121 which are alternately arranged, and is used to flatten the metal sheet M in a manner such that the metal sheet M passes between the upper and lower work rolls 121. The leveler 120 of the embodiment does not completely remove the winding tendency (warping) of the coil C in the metal sheet M and adjusts the winding tendency to a degree such that the metal sheet may be processed by the first press machine 130.

The first press machine 130 includes a male die (punch) 131 and a female die (die) 132, and is used to punch the metal sheet M into a predetermined shape by a pressing process, and upper and lower dies 133 and 134.

The second press machine 140 includes plural female dies (warping dies) 141 and 143 which are arranged in one direction, male dies (warping punches) 142 and 144 which are arranged in one direction, and upper and lower dies 145 and 146, and is used to warp the metal sheet M by a pressing process. Then, the metal sheet M is gradually formed in a cylindrical shape in a manner such that the metal sheet M is sequentially warped by other dies while the metal sheet M is intermittently sent in one direction by a transport unit (not shown).

Next, a method of manufacturing the transport roller 15 will be described.

First, for example, a coil C is prepared in which the metal sheet M such as a cold rolled steel sheet or an electrogalvanized steel sheet having a sheet thickness of about 0.8 mm to 1.2 mm is wound in the rolling direction. Then, the coil C is supported by the uncoiler 110 of the device 100, and the coil C is rotated about the axis so that the metal sheet M is uncoiled. The metal sheet M uncoiled from the coil C is maintained in a state in which a winding tendency is left so that the inner peripheral side surface C1 of the coil C is formed in a concave surface and the outer peripheral side surface C2 is formed in a convex surface when the coil C is seen from the side thereof. The uncoiled metal sheet M is transported in one direction (rolling direction) by a transport unit (not shown), and arrives at the leveler 120.

The metal sheet M arriving at the leveler 120 is flattened by plural upper and lower work rolls 121 so that its winding tendency is adjusted. Accordingly, the metal sheet M is flattened to a degree such that the metal sheet M may be processed by the first press machine 130, but the winding tendency making the inner peripheral side surface C1 of the coil C as a concave surface is left to a certain degree. The metal sheet M flattened by the leveler 120 is transported in one direction by a transport unit (not shown) so that it arrives at the first press machine 130.

Figure 5A:
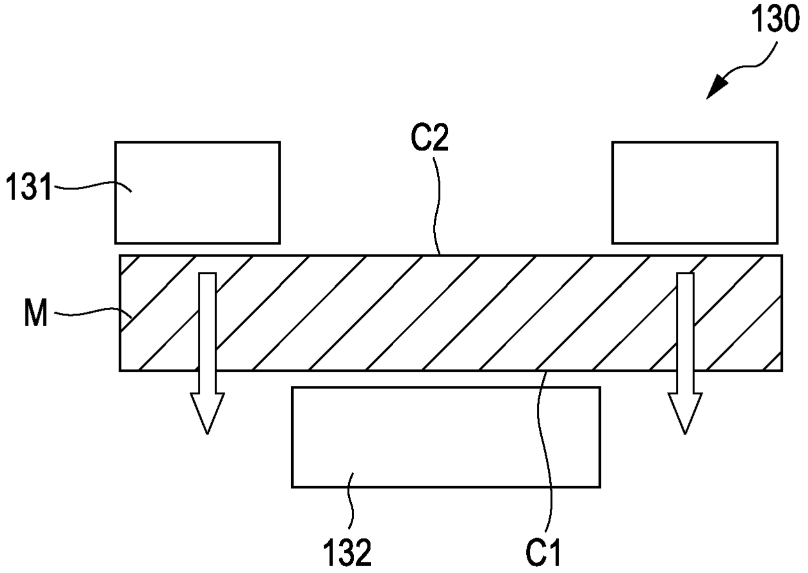
FIGS. 5A and 5B are cross-sectional views illustrating a punching process according to the embodiment.
Figure 5B:
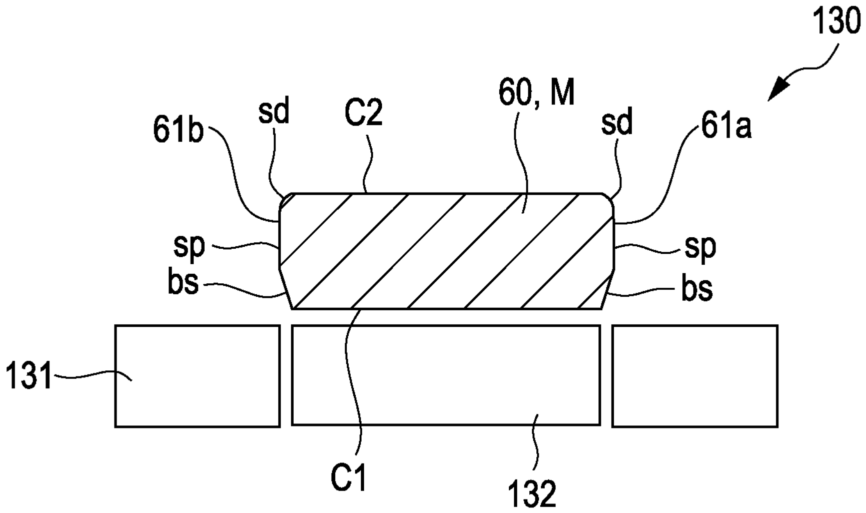

The metal sheet M arriving at the first press machine 130 is punched through the pressing process using the male die 131 and the female die 132. In the punching process, for example, as shown in FIGS. 5A and 5B, the punched metal sheet M is used as a base material. That is, the metal sheet M which is a base material of the roller body 16 is warped to have a cylindrical shape in which the upper surface C2 facing the male die 131 shown in FIG. 5A is formed as the outer peripheral surface.

In this case, in the punching process, even when a sag sd, a sheared surface sp, a broken surface bs, and a burr (not shown) are formed in the metal sheet M shown in FIG. 5B, it is desirable that the upper surface C2 having a comparatively smooth sag sd formed thereon is formed as the outer peripheral side of the roller body 16. In other words, it is desirable that the lower surface C1 of the metal sheet M continuous to the burr or the broken surface bs is formed as the inner peripheral side of the roller body 16.

Accordingly, when the roller body 16 having the joint 80 (refer to FIG. 8C and the like) is formed by allowing the pair of end surfaces 61*a* and 61*b* of the metal sheet M to abut on each other, the joint 80 may be prevented from being opened by using an uneven portion of the burr or the broken surface bs as an obstacle.

Accordingly, the precision of the joint 80 of the roller body 16 may be improved, and the transport roller 15 having high transport precision may be provided. Further, since it is possible to prevent the burr from being protruded from the outer peripheral surface of the roller body 16 by allowing the burr to be located at the inner peripheral surface side of the roller body 16, a burr removing process may be omitted, thereby improving productivity.

Figure 6:
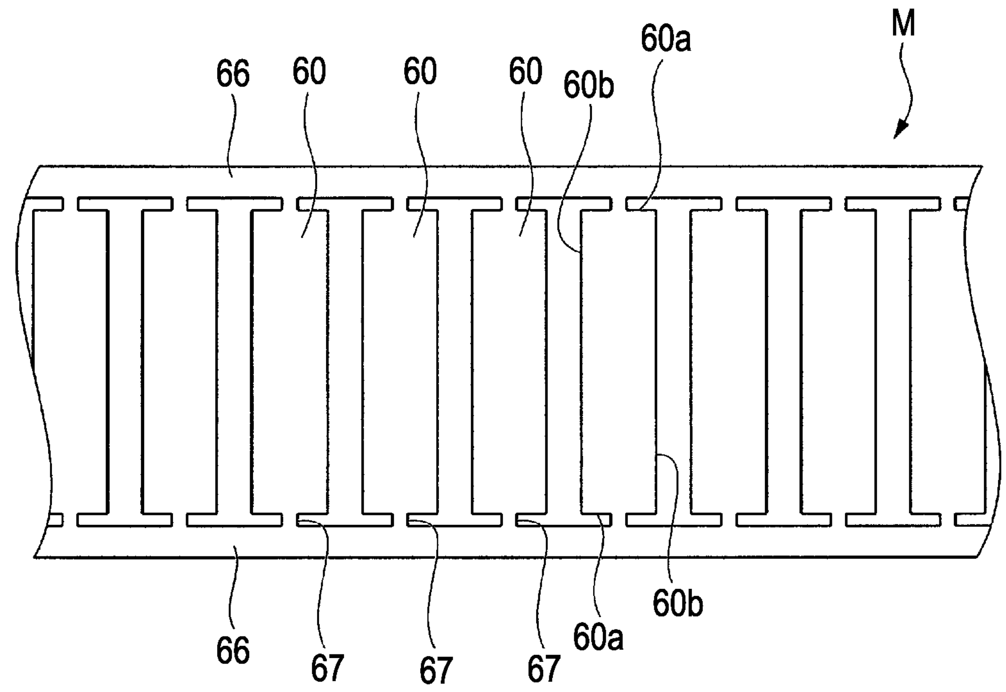
FIG. 6 is a cross-sectional view illustrating a forging process.

FIG. 6 is a plan view illustrating the metal sheet M which is punched by the first press machine 130.

As shown in FIG. 6, after the punching process, the metal sheet M is provided with a frame portion 66 which is continuous in the transport direction (rolling direction), a stripe-shaped flat sheet portion 60 which extends in the direction intersecting the transport direction, and a connection portion 67 which connects the frame portion 66 and the flat sheet portion 60 to each other. In the embodiment, the flat sheet portion 60 is formed in a substantially rectangular shape, a short side 60*a* is parallel to the rolling direction, and a long side 60*b* is perpendicular to the rolling direction. By repeating the pressing process while the metal sheet M is intermittently transported by a transport unit (not shown), plural flat sheet portions 60 and plural connection portions 67 are formed in the transport direction of the metal sheet M at the same interval therebetween.

The metal sheet M punched by the first press machine 130 is transported by a transport unit (not shown) so that it arrives at the second press machine 140 shown in FIG. 4.

FIGS. 7A to 7C and FIGS. 8A to 8C are side views illustrating a warping process of the second press machine 140.

The flat sheet portion 60 of the metal sheet M arriving at the second press machine 140 is warped by a pressing process in the direction (rolling direction) parallel to the short side 60*a* shown in FIG. 6. That is, the warping process is performed so that the pair of end surfaces following both long sides 60*b* and 60*b* of the flat sheet portion 60 is close to each other. Then, as shown in FIGS. 7A to 7C and FIGS. 8A to 8C, the flat sheet portion is formed in a cylindrical shape so that the pair of end surfaces faces and abuts on each other.

Figure 7A:
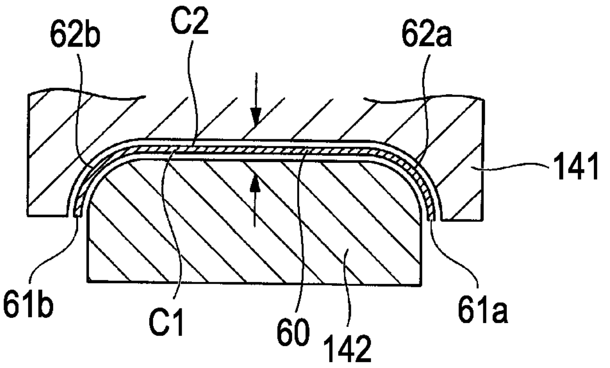
FIGS. 7A to 7C are plan views illustrating a metal sheet subjected to the forging process according to the embodiment.

Specifically, first, the flat sheet portion 60 of the metal sheet M is pressed by the female die (warping die) 141 and the male die (warping punch) 142 shown in FIG. 7A, so that both side portions 62*a* and 62*b* of the flat sheet portion 60 are warped in a circular arc shape (desirably, substantially ¼ circular arc). Furthermore, FIG. 7A shows that the flat sheet portion 60, the female die 141, and the male die 142 are arranged at an interval therebetween so that the members may be easily recognized, but such an interval does not exist in the actual arrangement, and the flat sheet portion 60, the female die 141, and the male die 142 come into close contact with each other with the contact portion therebetween. The same applies to FIGS. 7B and 7C and FIGS. 8A to 8C.

Here, the male die 142 is disposed to face the inner peripheral side surface C1 (the lower surface of the flat sheet portion 60 of FIGS. 7A to 7C) of the coil C shown in FIG. 4. Further, the female die 141 is disposed to face the outer peripheral side surface C2 (the upper surface of the flat sheet portion 60 of FIGS. 7A to 7C) of the coil C shown in FIG. 4. Accordingly, both side portions 62*a* and 62*b* of the flat sheet portion 60 are warped toward the inner peripheral side surface C1 of the coil C.

Figure 7B:
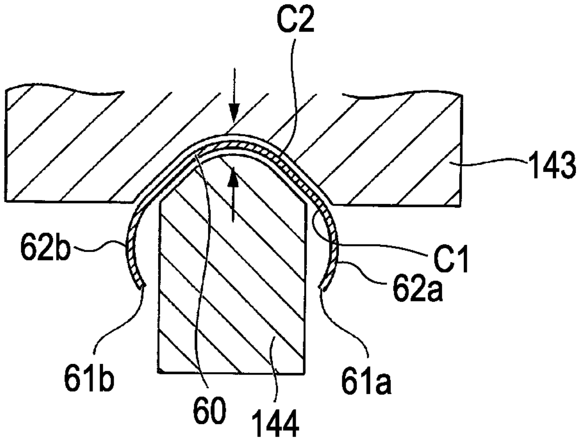

Next, after the metal sheet M is sent in one direction, the center portion of the flat sheet portion 60 in the short side direction (warping direction) is pressed by the second female die (warping die) 143 and the second male die (warping punch) 144 shown in FIG. 7B. Then, the flat sheet portion 60 is warped in a circular arc shape (desirably, substantially ¼ circular arc) toward the inner peripheral side surface C1 of the coil C shown in FIG. 4.

Figure 7C:
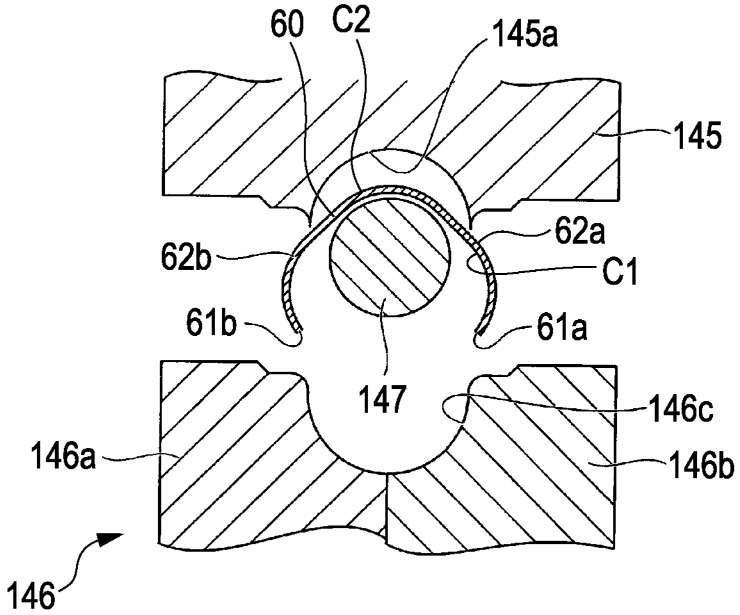

Next, after the metal sheet M is sent in one direction, as shown in FIG. 7C, a core die 147 is disposed on the inside of the flat sheet portion 60. Then, the end surfaces 61*a* and 61*b* of both side portions 62*a* and 62*b* of the flat sheet portion 60 are made to be close to each other as shown in FIGS. 8A to 8C by using an upper die 145 and a lower die 146 shown in FIG. 7C.

Figure 8A:
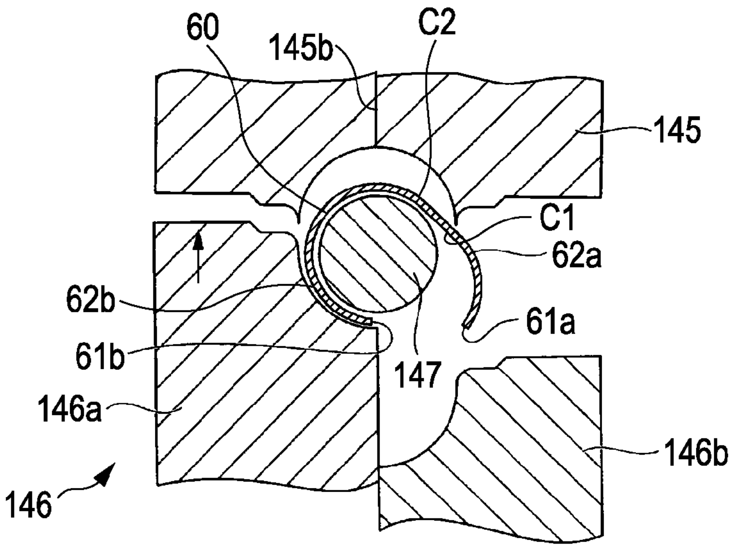
FIGS. 8A to 8C are diagrams illustrating a warping process according to the embodiment.
Figure 8B:
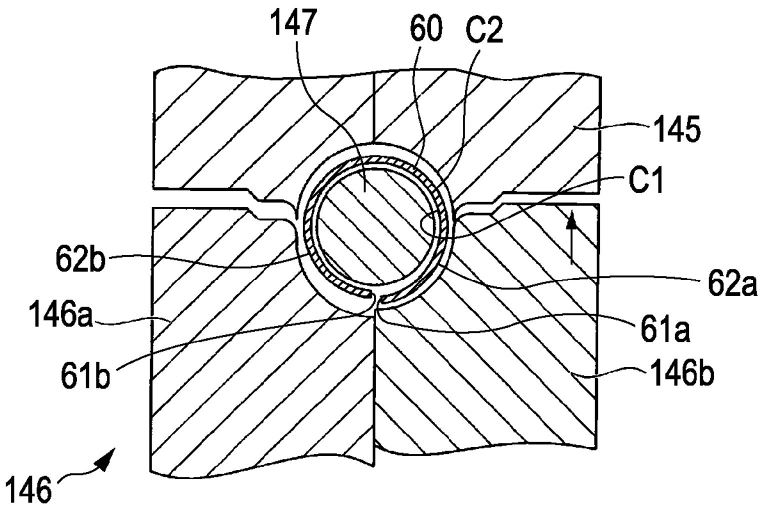
Figure 8C:
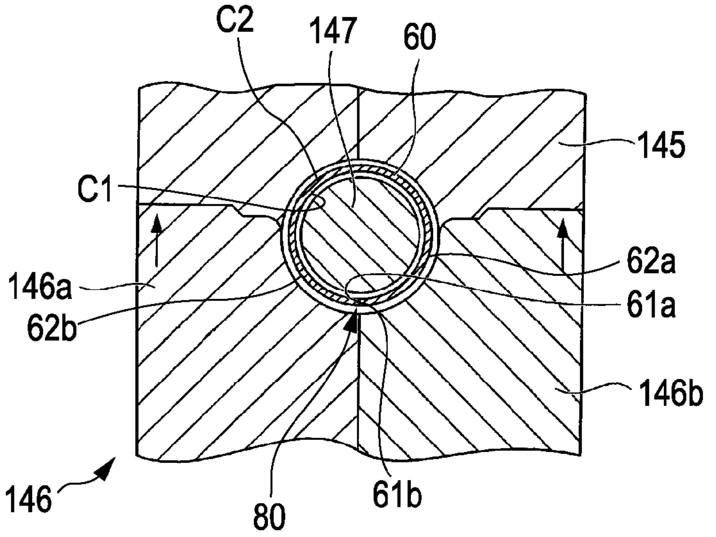

Here, the outer diameter of the core die 147 shown in FIG. 7C and FIGS. 8A to 8C is set to be equal to the inner diameter of the hollow cylindrical roller body 16. Further, as shown in FIG. 7C, the radius of the press surface 146*c* of the lower die 146 and the radius of the press surface 145*a* of the upper die 145 are respectively set to be equal to the outer diameter of the roller body 16 in consideration of a grinding process. Further, as shown in FIGS. 8A to 8C, the lower die 146 is formed as a pair of left and right divided dies, and each of the divided dies 146*a* and 146*b* is adapted to be independently elevated.

That is, in the state shown in FIG. 7C, the left divided die 146*a* is made to be close to the upper die 145 as shown in FIG. 8A, and one side of the flat sheet portion 60 is pressed so as to be warped in a substantially semi-circular shape. Furthermore, as in the lower die 146, the upper die 145 may be formed as a pair of left and right divided dies (refer to the divided surface 145*b*), and the upper die on the same side may be made to be close to the divided die 146*a* during the same process shown in FIG. 8A.

Subsequently, as shown in FIG. 8B, the core die 147 is slightly moved toward the upper die 145 (to a degree that one end surface 61*a* and the other end surface 61*b* may be made to be close to each other), and the other divided die 146*b* is made to be close to the upper die 145. Then, the other side of the flat sheet portion 60 is pressed to be warped in a substantially semi-circular shape.

Subsequently, as shown in FIG. 8C, the core die 147 and the pair of divided dies 146*a* and 146*b* are all made to be close to the upper die 145, thereby forming the cylindrical roller body (hollow pipe) 16. In this state, both left and right end surfaces 61*a* and 61*b* face and abut on each other. That is, in the cylindrical roller body 16, both end surfaces 61*a* and 61*b* of the flat sheet portion 60 of the metal sheet M as a base material are made to be close to each other, and the joint is formed between the end surfaces 61*a* and 61*b*. Here, the inner peripheral side surface C1 of the coil C shown in FIG. 4 is formed as the inner peripheral surface of the roller body 16, and the outer peripheral side surface C2 of the coil C is formed as the outer peripheral surface of the roller body 16. In this manner, the roller body 16 is formed so that the flat sheet portion 60 is wound on the core die 147.

Figure 9:
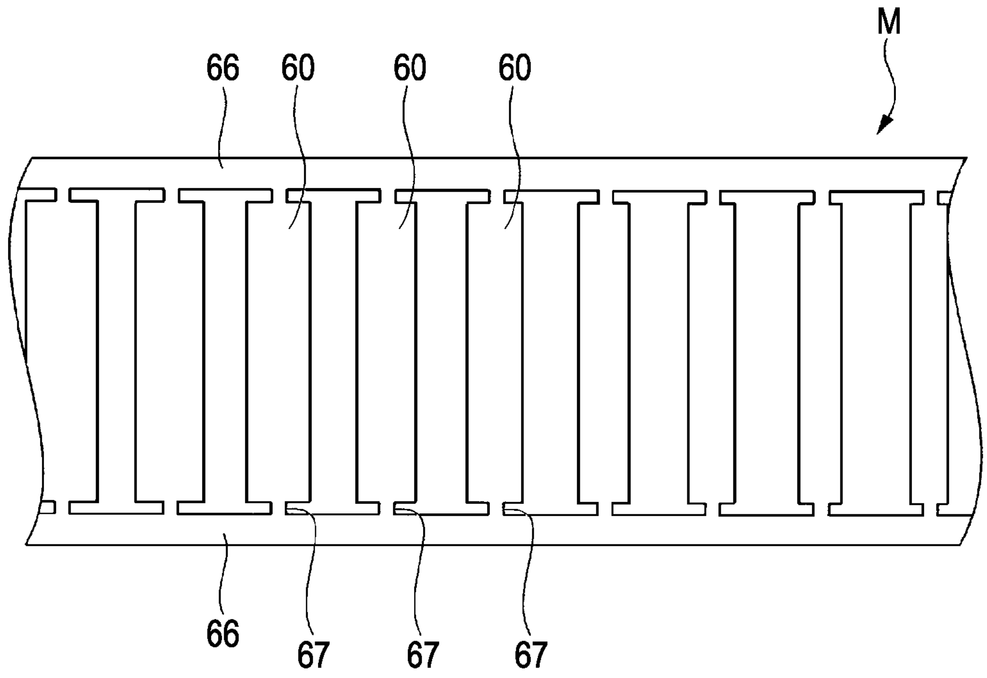
FIG. 9 is a diagram illustrating the warping process according to the embodiment and illustrating the metal sheet that is formed in a cylindrical shape.

FIG. 9 is a plan view illustrating the metal sheet M in which the flat sheet portion 60 is gradually formed in a cylindrical shape through the processes shown in FIGS. 7A to 7C and FIGS. 8A to 8C.

As shown in FIG. 6, the punched metal sheet M arrives at the second press machine 140 shown in FIG. 4, and the flat sheet portion 60 is sequentially warped by a pressing process of the processes shown in FIGS. 7A to 7C and FIGS. 8A to 8C (forward pressing process) while the metal sheet is intermittently sent in one direction. For this reason, as shown in FIG. 9, the flat sheet portion 60 arriving at the second press machine 140 is substantially formed in a cylindrical shape by as much as the metal sheet M is moved forward. After the flat sheet portion 60 is formed in a cylindrical shape, the connection portion 67 is cut by a cutting unit (not shown), thereby forming the hollow cylindrical roller body 16.

Next, a spot welding process is performed on the joint 80 of the roller body 16. The spot welding process is performed to form the spot welding portion SP in the joint 80, which improves the strength of the joint 80 in the spot welding portion SP. In this configuration, for example, as shown in FIG. 10A, a laser beam L is emitted from a laser emission device LA to a spot forming area SA to fuse the spot forming area SA.

In the spot forming area SA, a part of the fused metal sheet M is solidified while being connected to the end portions 61*a* and 61*b* of the metal sheet M, thereby forming the spot welding portion SP. In the embodiment, an example is shown in which a laser beam L is emitted to a part of the metal sheet M to fuse the portion, but the invention is not limited thereto. For example, the metal sheet M may be fused by using any method (for example, a heating method or the like).

Subsequently, in the embodiment, a centerless grinding process is performed on the roller body 16 so that its circularity is improved and a deviation in the product is reduced. In the grinding process, for example, as shown in FIG. 10B, the outer peripheral surface 16*a* of the roller body 16 is ground by using cylindrical whetstone members GD.

The roller body 16 is disposed between two whetstone members GD disposed with a gap smaller than the outer diameter of the roller body 16, and the roller body 16 is made to contact the outer peripheral portions of the two whetstone members GD. Subsequently, the two whetstone members GD are rotated, for example, in the same direction. By the rotation of the two whetstone members GD, a friction force is generated between each of the whetstone members GD and the roller body 16.

Furthermore, regarding the two whetstone members GD, it is desirable that the dimension in the length direction (the height direction of the cylinder) is larger than the roller body 16 so that the entire roller body 16 in the length direction may be ground at one time. Further, it is desirable that the roller body 16 is disposed at, for example, the center portion in the length direction of the whetstone members GD so that, for example, the entire roller body 16 in the length direction contacts the two whetstone members GD in order to ensure a margin in the length direction of the roller body 16 during the rotation of the whetstone members GD.

The outer peripheral surface 16*a* of the roller body 16 is ground while the roller body 16 is rotated in the direction opposite to the rotation direction of the whetstone members GD due to the friction force generated by the rotation of the whetstone members GD. For this reason, the entire outer peripheral surface 16*a* of the roller body 16 is evenly ground, and the circularity of the roller body 16 becomes more satisfactory compared to the case where the grinding process is not performed.

Figure 11A:
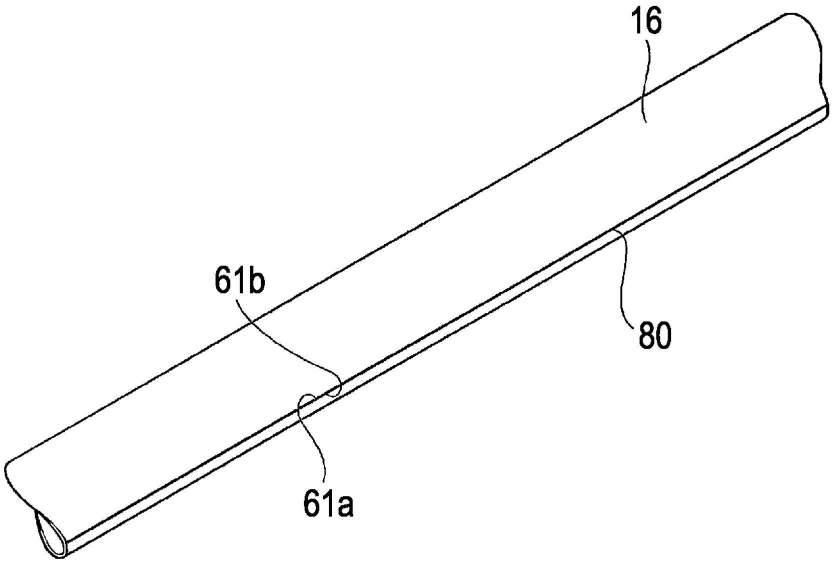
FIG. 11A is a perspective view illustrating a roller body.

After the grinding process, the roller body 16 having high circularity and less deviation is obtained. Furthermore, in the roller body 16, the gap between both end surfaces 61*a* and 61*b* is further narrowed, thereby forming the joint 80 having a narrowed gap between both end surfaces 61*a* and 61*b* as shown in FIG. 11A.

Furthermore, in the pressing process or the grinding process, it is desirable that a gap between both end surfaces 61*a* and 61*b* of the flat sheet portion 60 is eliminated, that is, both end surfaces 61*a* and 61*b* come into contact with each other. However, although the circularity or the deviation of the roller body 16 may be made satisfactory, it is difficult to completely eliminate the gap. Accordingly, in the present state, a certain degree of a gap is left.

Figure 11B:
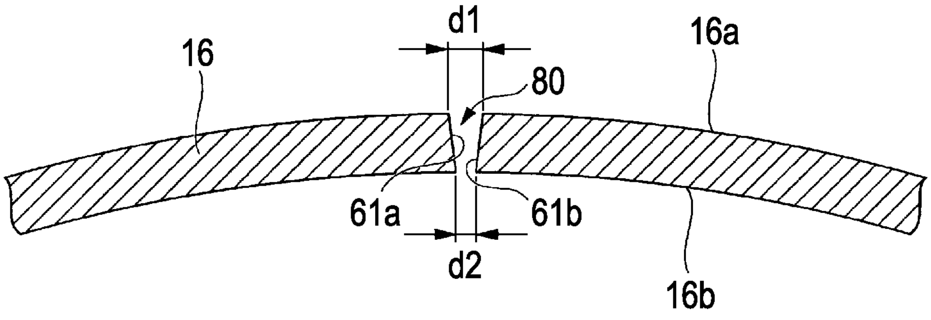
FIG. 11B is a side cross-sectional view illustrating a joint.

In the joint 80, since the outer peripheral surface and the inner peripheral surface of the flat sheet portion 60 have the same dimension (width), the distance between the pair of end surfaces 61*a* and 61*b* becomes relatively wider at the side of the outer peripheral surface 16*a* of the roller body 16 and becomes relatively narrower at the side of the inner peripheral surface 16*b* as shown in FIG. 11B.

In this manner, when the roller body 16 according to the invention is formed as a cylindrical shaft, the high friction layer 50 is formed on the surface of the roller body 16 as shown in FIGS. 3A to 3C.

As a method of forming the high friction layer 50, a drying method and a wetting method (or a method formed by the combination thereof) may be adopted, but in the embodiment, the drying method is preferably adopted. Specifically, first, resinous particles and inorganic particles are prepared as a material forming the high friction layer 50. As the resinous particles, fine particles each having a diameter of about 10 μm and formed of an epoxy resin or a polyester resin are preferably used.

Further, as the inorganic particle, a ceramic particle such as aluminum oxide (alumina; $Al_2O_3$), silicon carbide (SiC), or silicon dioxide ($SiO_2$) is preferably used. Among them, alumina has comparatively high hardness and satisfactorily exhibits a function of increasing a friction resistance. Further, since the price of alumina is comparatively low, a decrease in the manufacturing cost is not jeopardized. For this reason, alumina is more preferably used. Accordingly, in the embodiment, alumina particles are used as the inorganic particles.

The alumina particles used have a predetermined particle diameter distribution obtained through a crushing process. Since the alumina particles are manufactured by the crushing process, the end portions of the alumina particles are comparatively sharp and acute, so that the sharp and acute end portions exhibit a high friction force.

Further, in the embodiment, the alumina particle has a particle diameter which is greater than or equal to 15 μm and less than or equal to 90 μm and has a particle diameter (average particle diameter) as a center diameter which is adjusted to be 45 μm.

That is, in the invention, as the alumina particles (inorganic particles), the average particle diameter (center diameter) is set to be larger than the distance d1 (30 μm) from the outer peripheral surface side of the above-described joint 80.

Further, particularly regarding the particle diameter distribution (particle size range), it is desirable to contain a particle which is smaller than the distance d1 at the outer peripheral surface side of the joint 80 and is larger than the distance d2 (10 μm) at the inner peripheral surface side. Further, it is desirable that the minimum particle diameter in the particle diameter distribution is larger than the minimum distance between the pair of end portions 61*a* and 61*b* of the joint 80, for example, the distance d2 at the inner peripheral surface side.

When such resinous particles and inorganic particles are prepared, first, the above-described resinous particles are sprayed to the roller body 16. That is, the roller body 16 is disposed inside a painting booth (not shown), and the roller body 16 is integrally set to have, for example, a −(negative) potential.

Then, the resinous particles are sprayed (discharged) to the roller body 16 to be adhered thereto by using a tribo gun of an electrostatic painting device (not shown), and the sprayed particles (resinous particles) are charged to a +(positive) high potential. Then, the charged resinous particles are absorbed on the outer peripheral surface of the roller body 16, thereby forming a resinous film.

Figure 12A:
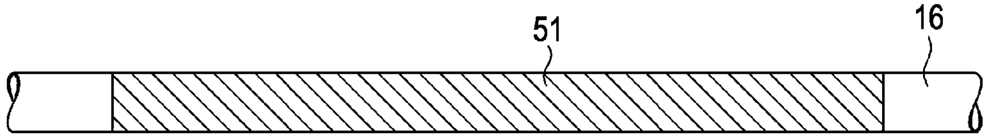
FIGS. 12A to 12C are diagrams illustrating a process of forming a high friction layer on a roller body.

Here, the position of the resinous film formed by adhesion of the resinous particles corresponds to the formation area of the high friction layer 50 shown in FIGS. 3A to 3C. That is, as shown in FIG. 12A, only the center portion except for both end portions is provided with the resinous film without forming the resinous film formed in the entire length of the roller body 16 by masking, for example, both end portions thereof using a tape or the like. That is, the resinous film 51 is selectively formed at an area corresponding to the center portion serving as an area contacting the sheet (medium) P in the transport roller 15 formed as the roller body 16. Furthermore, the joint 80 is not shown in FIGS. 12A, 12B, and 12C to be described later.

A weak static electricity of about +0.5 kV is present in the resinous film 51 after the painting process. Furthermore, in the painting process, the roller body 16 is rotated about the axis, so that the resinous film 51 is formed in the entire circumference with substantially the same thickness. The film thickness of the resinous film 51 is set to be, for example, from 10 μm to 30 μm in consideration of the particle diameter of the above-described alumina particles. The film thickness may be appropriately adjusted through the discharge amount of the resinous particles and the discharge time.

Subsequently, the roller body 16 provided with the resinous film 51 is taken out from the above-described painting booth, and is moved to another painting booth 90 shown in FIG. 13 by using a handling robot (not shown). The painting booth 90 is provided with a pair of rotational driving members 91 and 91 provided at the lower side thereof. Each of the rotational driving members 91 and 91 is provided with a chuck 92 which is used to support the roller body 16 in the substantially horizontal direction.

Then, both end portions of the roller body 16 are held and fixed by the chucks 92 and 92, and the chucks 92 and 92 are rotated by the rotational driving member 91. Accordingly, the roller body 16 is gradually and rotationally driven about the axis thereof at the speed of, for example, about from 100 rpm to 500 rpm. Furthermore, the roller body 16 may be, of course, supported in a slightly inclined state.

Figure 13:
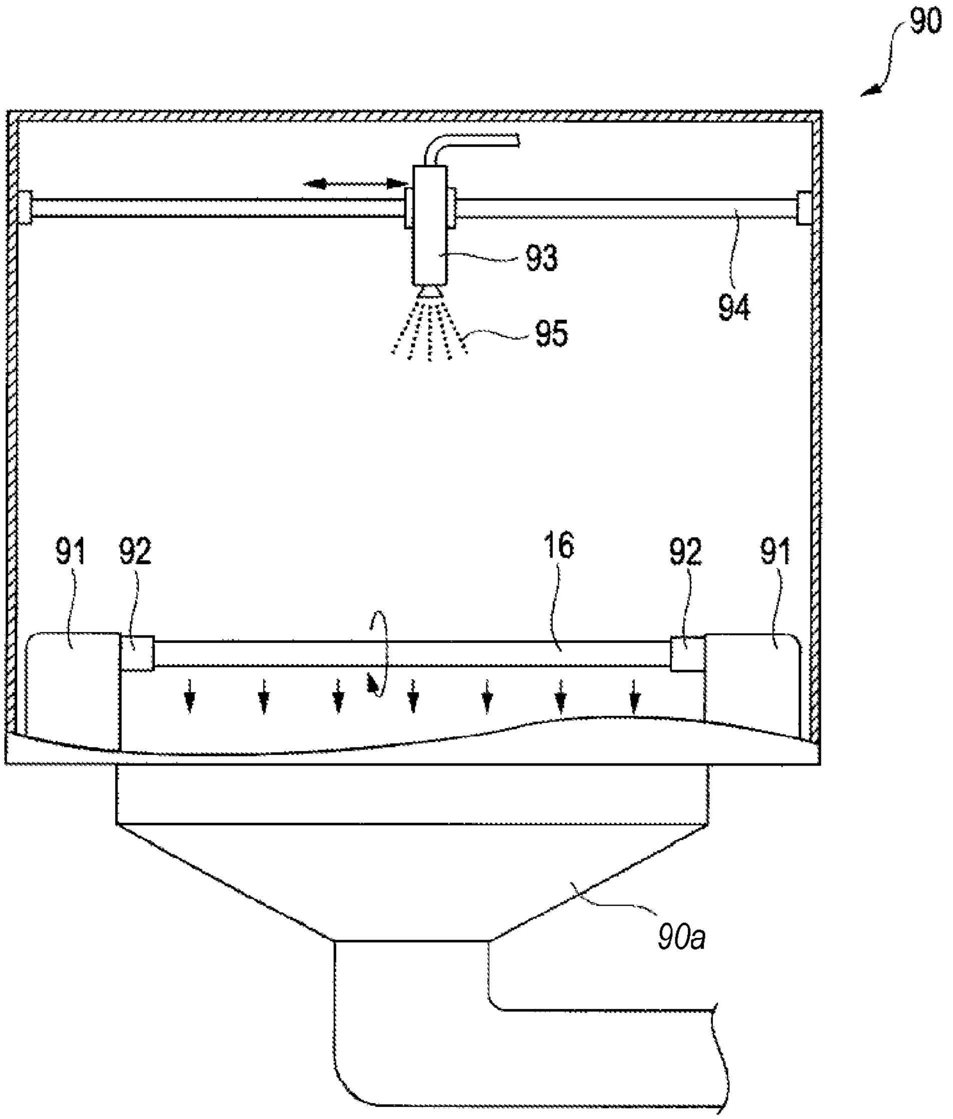
FIG. 13 is a schematic configuration diagram illustrating a painting booth that is used to form the high friction layer.

Further, a corona gun 93 is disposed at the upper portion of the painting booth 90, and the corona gun 93 is adapted to be movable along a shaft 94 in the left/right direction of FIG. 13. Further, an evacuation mechanism 90*a* is provided at the bottom portion of the painting booth 90. Accordingly, a slow air stream is formed inside the painting booth 90 to move toward the lower side thereof. Furthermore, the amount of suction air of the evacuation mechanism 90*a* is appropriately set.

With such a configuration, when the above-described alumina particles 95 are sprayed from the corona gun 93 to the roller body 16 rotating about its axis to be adhered thereto, the alumina particles 95 are selectively and electrostatically absorbed onto the resinous film 51 formed on the roller body 16. When the alumina particles are selectively and electrostatically absorbed onto the resinous film 51, both end portions of the roller body 16 are masked by using a tape or the like as in the case of forming the resinous film 51.

In such an electrostatic painting process, the surface potential of the chuck 92 and the rotational driving member 91 is set to be equal to the potential of the roller body 16, and the inner surface potential of the painting booth 90 is set to be substantially zero potential so that it becomes an electrically neutral state. Also, this is performed so that the alumina particles 95 from the corona gun 93 are not absorbed on the portion other than the roller body 16. In order that the inner surface potential of the painting booth 90 becomes an electrically neutral state, it is desirable that the painting booth 90 is made of a steel sheet having an inner surface electric resistance of, for example, about 1011Ω.

Then, the potential applied to the corona gun 93 is set to 0 V, and the pressure of air supplied to the corona gun 93 is set to be low such as to be about 0.2 MPa. Subsequently, the alumina particles 95 of substantially zero potential are sprayed from the upper side by moving the corona gun 93 in the left/right direction of FIG. 13, so that the alumina particles 95 are naturally dropped by their own weight in the vertical direction.

Then, as described above, since weak static electricity (about +0.5 kV) is present in the resinous film 51 of the roller body 16 due to the electrostatic painting process, the alumina particles 95 are substantially uniformly and electrostatically absorbed on the entire circumference of the resinous film 51. In the state where the alumina particles 95 electrostatically absorbed in this manner come into contact with the surface of the resinous film 51 and intrude thereinto, the alumina particles are adhered to the outer peripheral surface of the roller body 16 by using the resinous film 51 as a binder.

Here, in the embodiment, since the inner surface potential of the painting booth 90 is set to be substantially zero potential to be electrically neutral, and the slow air stream is formed inside the painting booth 90 toward the lower side thereof, the alumina particles 95 are dropped downward in the vertical direction due to their own weight. Since the horizontally supported roller body 16 slowly rotates about the axis thereof at the lower side of the dropping direction, the alumina particles 95 are substantially uniformly sprayed to the outer peripheral surface of the roller body 16.

Figure 12B:
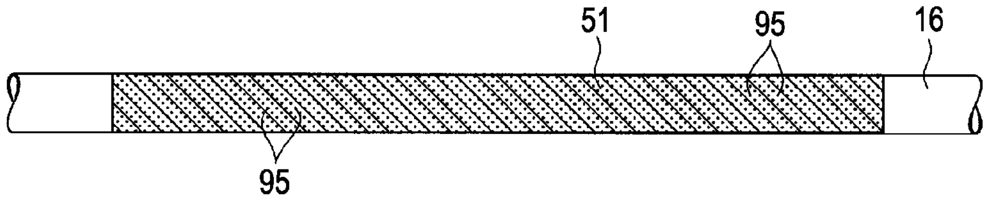

Accordingly, the alumina particles 95 are uniformly adhered to the surface of the specifically unmasked resinous film 51, so that the alumina particles (inorganic particles) 95 are dispersed and exposed in the resinous film 51 at the center portion of the roller body 16 as shown in FIG. 12B. That is, a part of the alumina particles 95 intrude into the resinous film 51 when coming into contact with the resinous film 51 due to its electrostatic absorbing force, and the rest thereof protrude from the surface of the resinous film 51. At this time, since the alumina particles 95 easily stand on the surface of the roller body 16 in the perpendicular direction, the alumina particles 95 are uniformly distributed thereon, and most of them are adhered thereto so that their sharp and acute end portions (top portions) face outward.

Accordingly, the alumina particles 95 exhibit a high friction force by using the end portions protruding from the surface of the resinous film 51. Here, in order that the alumina particles 95 exhibit sufficient friction force necessary for the sheet P, it is desirable that the ratio of the alumina particles 95 with respect to the area of the resinous film 51 is equal to or larger than 20% and less than or equal to 80%.

Furthermore, the coating (spraying) method of the alumina particles 95 is not limited to the electrostatic painting method as long as the alumina particles 95 may be gradually sprayed downward in the vertical direction. For example, the alumina particles may be sprayed by using a sprayer.

Figure 12C:
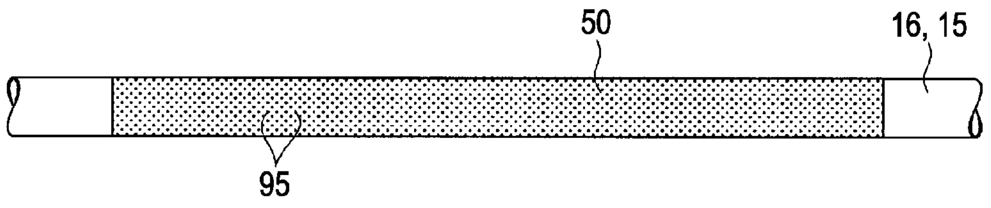

In this manner, when the alumina particles 95 are sprayed and adhered to the resinous film 51, the roller body 16 is heated at a temperature greater than or equal to 180° C. and less than or equal to 300° C. for 20 minutes to 30 minutes, so that the resinous film 51 is baked and cured. Accordingly, the alumina particles 95 are fixed to the roller body 16. In this manner, as shown in FIG. 12C, the high friction layer 50 is formed by dispersing and exposing the aluminum particles (inorganic particles) 95 in the resinous film 51, thereby obtaining the transport roller 15 according to the invention.

Furthermore, in the embodiment, the coating (spraying) of the resinous particles and the coating (spraying) of the alumina particles are respectively performed in the different painting booths, but they may be, of course, performed in the same painting booth.

When the high friction layer 50 is formed in this manner, particularly in the joint 80, a groove caused by the gap between the end surfaces 61*a* and 61*b* of the flat sheet portion 60 is not formed, and the gap between the end surfaces 61*a* and 61*b* is mainly buried by the alumina particles 95.

Figure 14:
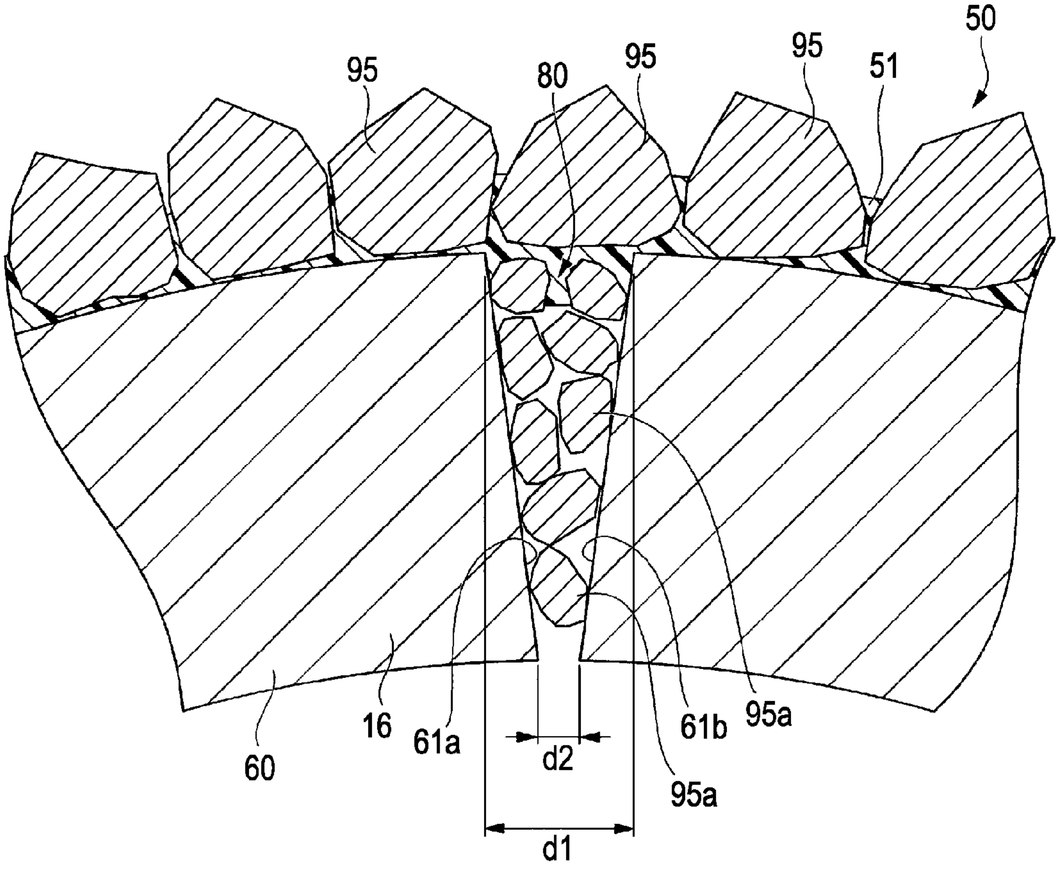
FIG. 14 is an enlarged diagram illustrating the joint of the roller body and a main part therearound.

That is, as for the alumina particles 95 used herein, the average particle diameter is larger than the distance d1 at the outer peripheral surface side of the joint 80. Accordingly, most of the alumina particles 95 do not intrude into the joint 80, but are adhered to the outer peripheral surface of the roller body 16 with the resinous film 51 interposed therebetween as shown in FIG. 14. Accordingly, although the joint 80 is provided with a gap between the end surfaces 61*a* and 61*b* of the flat sheet portion 60, the groove caused by the gap is not substantially formed by covering the gap with the alumina particles 95.

Further, the alumina particles 95 used have a particle diameter distribution (particle size range) containing the particle 95*a* smaller than the distance d1 (30 μm) at the outer peripheral surface side of the joint 80 and larger than the distance d2 (10 μm) at the inner peripheral surface side thereof. Accordingly, such particles 95*a* intrude and stay in the gap formed in the joint 80, thereby reliably preventing the groove from being formed by the joint 80.

Further, even when a force acts on the roller body 16 (the transport roller 15) in the direction in which the gap is narrowed, the alumina particles 95*a* intruding therein resist the force, so that the deformation of the roller body 16 (the transport roller 15) is suppressed. Accordingly, in the transport roller mechanism 19 having the transport roller 15, the transport irregularity caused by the deformation of the transport roller 15 may be prevented.

Furthermore, the alumina particles 95 used have a minimum particle diameter in the particle diameter distribution larger than the minimum distance between the pair of end surfaces 61*a* and 61*b* of the joint 80, that is, the distance d2 at the inner peripheral surface side. Accordingly, when the high friction layer 50 is formed by disposing the alumina particles 95 on the surface of the roller body 16, the alumina particles 95 may not intrude into the roller body 16 through the gap formed in the joint 80. Accordingly, a process or the like of cleaning the inside of the roller body 16 does not need to be performed, thereby improving the productivity.

Through the above-described processes, as shown in FIG. 3A, the transport roller 15 is obtained which has the high friction layer 50 formed by dispersing and exposing the alumina particles in the resinous film.

As described above, according to the embodiment, since the spot welding portion SP is formed in the joint 80 between the pair of facing end portions 61*a* and 61*b* of the metal sheet M, the strength of the joint 80 may be improved. Accordingly, the deformation of the joint 80 may be prevented. Further, in the embodiment, since the spot welding portion SP is formed in a part of the joint 80 instead of welding the entire joint 80, the transport roller is not affected by the internal stress generated when the entire joint is welded. Accordingly, since the deformation of the transport roller 15 may be prevented, the degradation of the transport precision may be prevented.

The technical scope of the invention is not limited to the above-described embodiment, but may be appropriately modified within the range not departing from the spirit of the invention.

Further, in the above-described embodiment, a configuration has been described in which the roller body 16 is formed from a base material which is a steel sheet coil obtained by winding a metal sheet such as a zinc plating steel sheet or a stainless steel sheet, but the invention is not limited thereto. For example, a configuration may be adopted in which a plane metal sheet is used as a base material, a metal sheet substantially having the same dimension as that of the flat sheet portion 60 is formed from the planar metal sheet, and the metal sheet is processed to form the roller body 16. Accordingly, for example, in the description above or below, the flat sheet portion 60 may be replaced with the metal sheet.

Figure 15A:
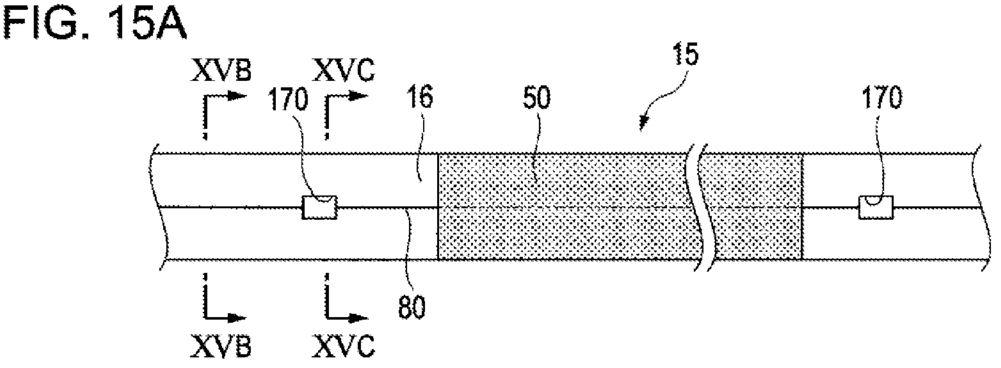
FIGS. 15A to 15D are schematic diagrams illustrating a configuration of the roller body, with FIG. 15B being a sectional view through section XVB and FIG. 15C being a sectional view through section XVC.

Further, for example, a part of the joint 80 formed in the roller body 16 may be provided with an opening 170 as shown in FIG. 15A.

Figure 15B:
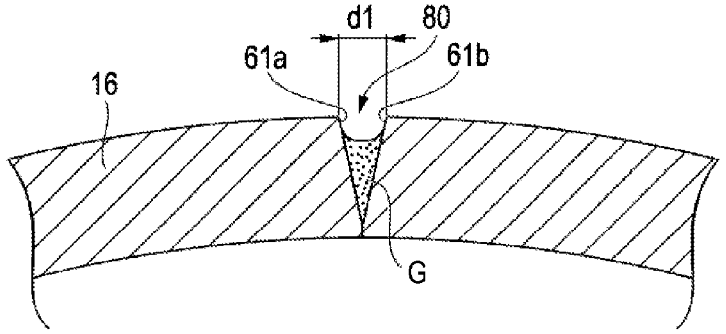

As shown in FIG. 15B, the joint 80 formed in the roller body 16 has a groove shape in which the inner peripheral sides of the pair of end surfaces 61*a* and 61*b* come into close contact with each other, and the outer peripheral sides thereof are spaced from each other. Alternatively, the joint 80 may be formed as a gap in which the end surfaces 61*a* and 61*b* are slightly spaced from each other without allowing the pair of end surfaces 61*a* and 61*b* to come into contact with each other. Then, since the joint 80 is formed in the entire length of the transport roller 15, when the grease G supplied to the bearing 26 is adhered to the surface of the transport roller 15, the grease G flows along the joint 80 due to a capillary phenomenon. In particular, the capillary phenomenon of the grease G becomes stronger as the joint 80 (the maximum distance d1 between the end surfaces 61*a* and 61*b*) becomes smaller in order to improve the strength of the transport roller 15, whereby the grease G tends to easily flow along the joint 80.

Figure 15C:
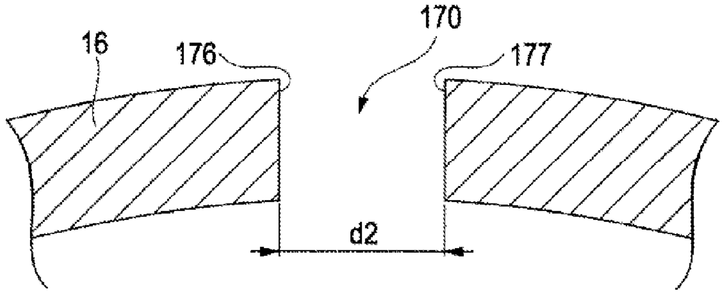

Therefore, as shown FIG. 15C, a part of the joint 80 formed in the roller body 16 is provided with the opening 170. As shown in FIG. 15C, the opening 170 includes notch portions 176 and 177 respectively formed in the pair of end surfaces 61*a* and 61*b* forming the joint 80. When the end surfaces 61*a* and 61*b* abut on each other, the maximum distance d2 between the notch portions 176 and 177 is set to be, for example, about 1 mm or more, whereby the gap serves as the opening 170.

The opening 170 is formed in an area excluding the area supported by the bearing 26 and the area provided with the high friction layer 50 in the joint 80 that is formed in the entire length of the transport roller 15 (the roller body 16). That is, the high friction layer 50 is formed at the substantially center portion of the transport roller 15, and both end sides of the transport roller 15 are supported by the bearing 26, whereby the transport roller 15 is provided with at least two openings 170.

The opening 170 is provided for the purpose of preventing the grease G (lubricating oil) supplied (coated) onto the bearing 26 from arriving at the high friction layer 50 along the joint 80 (the gap between the end surfaces 61*a* and 61*b*). That is, the capillary phenomenon of the grease G is stopped by providing the opening 170 at a part of the joint 80. Specifically, since the opening 170 is provided in an area provided with the high friction layer 50 and the area supported by the bearing 26 in the joint 80, the grease G is prevented from arriving at the high friction layer 50. Then, the capillary phenomenon of the grease G may be reliably stopped by adjusting the size (the maximum distance d2 between the pair of notch portions 176 and 177) of the opening 170.

Figure 15D:
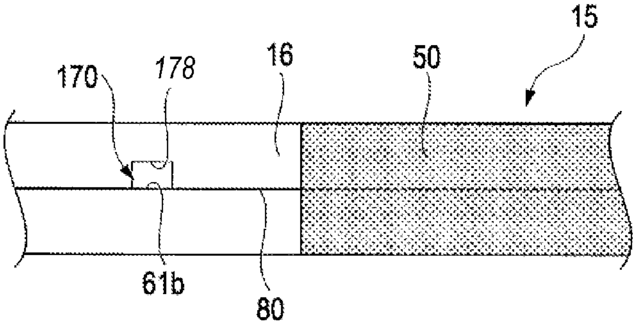

Furthermore, the invention is not limited to the case in which the notch portions 176 and 177 forming the opening 170 are respectively formed in the pair of end surfaces 61*a* and 61*b* forming the joint 80. That is, as shown in FIG. 15D, a case may be adopted in which only one (for example, the end surface 61*a*) of the pair of end surfaces 61*a* and 61*b* forming the joint 80 is provided with the notch 178, and the opening 170 is formed by the notch portion 178 and the end surface 61*b*. Further, the shape of the opening 170 is not limited to the rectangular shape, but may be a circular shape and the like.

Figure 16A:
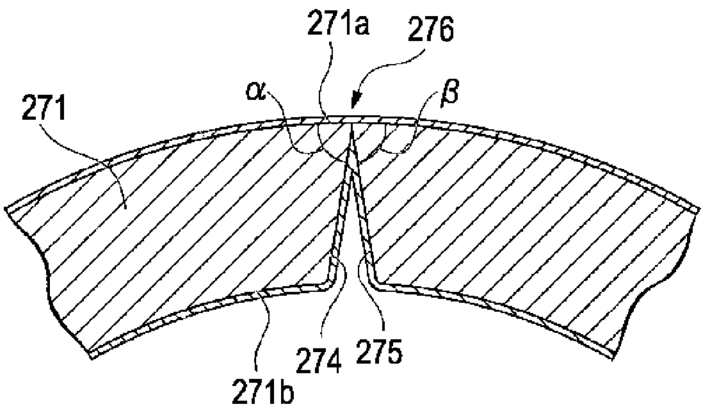
FIGS. 16A to 16C are schematic diagrams illustrating the configuration of the roller body.

Further, the shape of the joint 80 formed in the roller body 16 may have a shape shown in FIG. 16A. That is, the joint 80 has a configuration in which a first end surface 274 and a second end surface 275 are connected to each other at the side of the outer peripheral surface 271*a* of the roller body 271. The gap between the first end surface 274 and the second end surface 275 is set to be gradually enlarged in the direction from the outside to the inside in the radial direction. Further, the shapes of the first end surface 274 and the second end surface 275 are formed in the same shape throughout the entire length of the roller body 271 other than a bent portion 85.

Further, a first angle α formed between the first end surface 274 and the outer peripheral surface 271*a* and a second angle β formed between the second end surface 275 and the outer peripheral surface 271*a* are both set to be smaller than 90°.

The first end surface 274 and the second end surface 275 of the joint 80 are connected to each other at the side of the outer peripheral surface 271*a*, opposite from the inner peripheral surface 271*b*, and the smoothness of the outer peripheral surface 271*a* at the connection portion 276 is improved. For this reason, even when the transport roller 15 is rotated, the outer peripheral surface thereof may reliably contact the recording sheet P. For this reason, the recording sheet P may be transported with high precision.

Figure 16B:
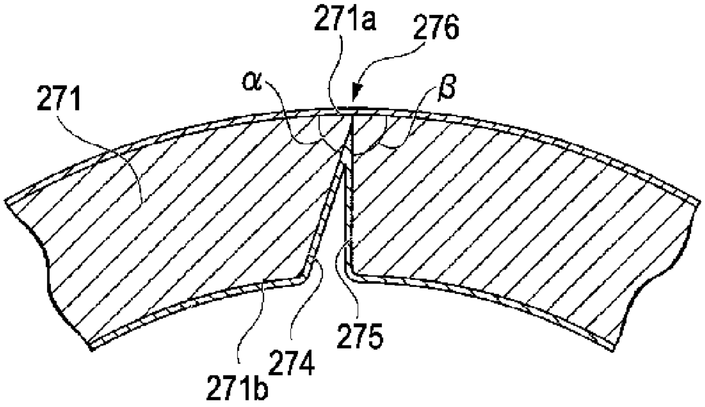

As shown in FIG. 16B, the shape of the joint 80 is formed such that the first angle α formed between the outer peripheral surface 271*a* and the first end surface 274 of the joint 80 is smaller than 90°, and the second angle β formed between the outer peripheral surface 271*a* and the second end surface 275 is 90° or more. That is, the first end surface 274 and the second end surface 275 at the connection portion 276 may be inclined in a predetermined direction with respect to the circumferential direction.

Furthermore, the shape of the joint 80 is formed by the following processes. That is, after a metal sheet 270, having a thickness t (see FIG. 16C) is formed by a punching process in a forward pressing process, an end surface adjusting process is performed on the first end surface 274 and the second end surface 275 of the metal sheet 270, so that the inclination of each of the first end surface 274 and the second end surface 275 with respect to the outer peripheral surface 271*a* is adjusted.

Figure 16C:
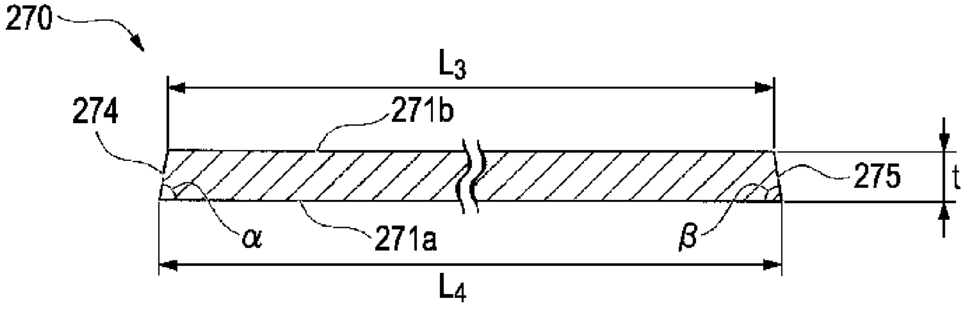

As shown in FIG. 16C, the inclination of each of the first end surface 274 and the second end surface 275 with respect to the outer peripheral surface 271*b* is adjusted through a pressing process. Through the adjustment, the first angle α formed between the outer peripheral surface 271*a* and the first end surface 274 and the second angle β formed between the outer peripheral surface 271*a* and the second end surface 275 are both smaller than 90° and the length between the first end surface 274 and the second end surface 275 at the outer peripheral surface 271*b* is $L_4$ and the length between the first end surface 274 and the second end surface 275 at the inner peripheral surface 271*a* is $L_3$.

Accordingly, when the metal sheet 270 is warped in the cylindrical roller body 271, the first end surface 274 and the second end surface 275 are connected to each other at least at the side of the outer peripheral surface 271*a*.

Figure 17A:
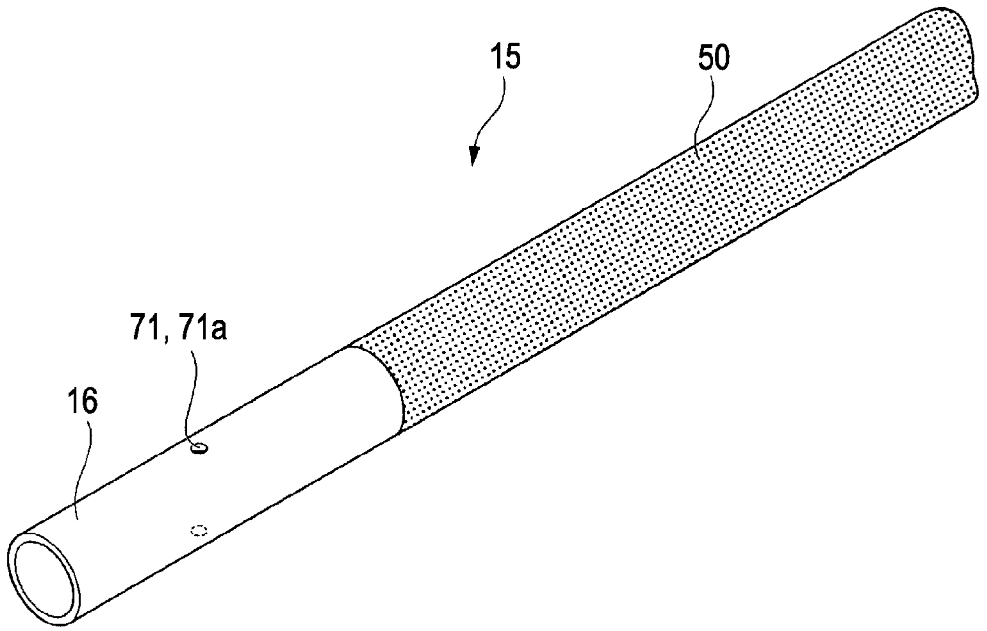
FIG. 17A is a perspective view illustrating the main part of the roller body.
Figure 17B:
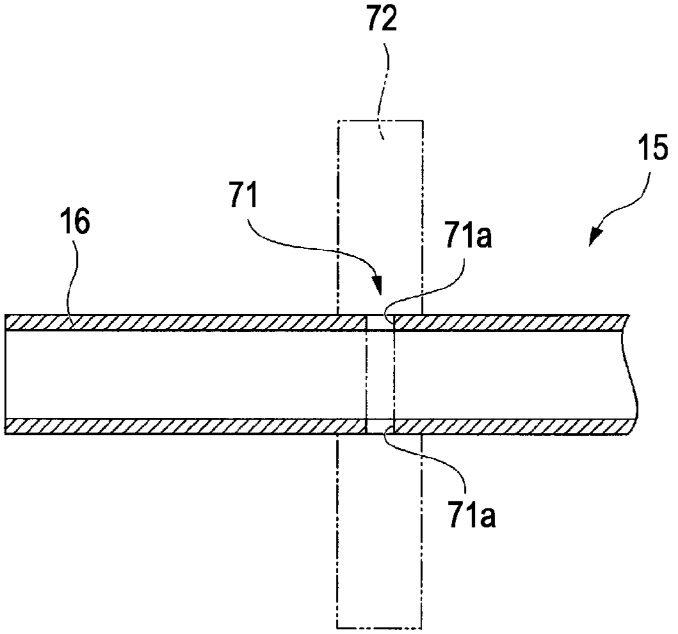
FIG. 17B is a side view thereof.

Further, as described above, one or both end portions of the roller body 16 (the transport roller 15) are provided with the engagement portion which is used for the connection to various connection components such as the transport driving gear 35 or the inner gear 39 shown in FIGS. 2A and 2B. For example, as shown in FIGS. 17A and 17B, penetration holes 71*a* and 71*a* are respectively formed in the facing positions of the roller body 16 formed as the cylindrical pipe (hollow pipe), that is, the two point formation surface defining the diameter of the roller body 16, thereby forming an engagement hole (engagement portion) 71 including the pair of penetration holes 71*a* and 71*a*. According to the engagement hole 71, a connection component 72 such as a gear may be fixed by a shaft or a pin (not shown).

Figure 18A:
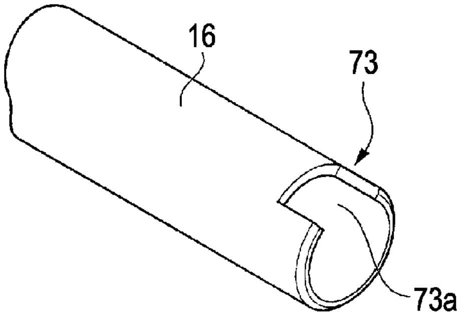
FIG. 18A is a perspective view illustrating the main part of the roller body.
Figure 18B:
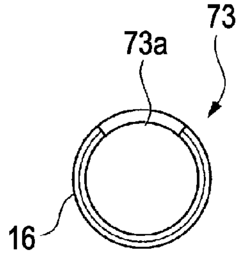
FIG. 18B is a side view thereof.

Further, as shown in FIGS. 18A and 18B, an engagement portion 73 may be formed in the end portion of the roller body 16 to have a D-cut shape. The engagement portion 73 has an opening 73*a* which is formed in the end portion of the cylindrical hollow pipe (the roller body 16) so that a part thereof is cut in a rectangular shape in the plan view as shown in FIG. 18A, whereby the side end portion of the engagement portion has a D-shaped external shape as shown in FIG. 18B.

Accordingly, when a connection component (not shown) such as a gear engages with the engagement portion 73 having the D-shaped external shape, the connection component may be attached thereto without meaninglessly rotating the connection component with respect to the roller body 16 (the transport roller 15). Further, since the engagement portion 73 is provided with the groove-shaped opening 73*a* communicating with the inner hole of the hollow pipe (the roller body 16), the connection component may be attached to the roller body 16 without the meaningless rotation with respect thereto by using the opening 73*a*. Specifically, when a convex portion is formed in the connection component, and the convex portion is fitted to the opening 73*a*, the meaningless rotation may be prevented.

Figure 19A:
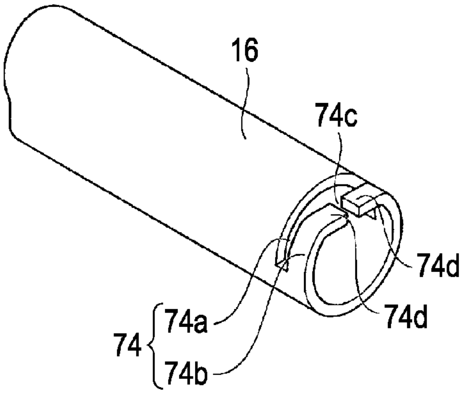
FIG. 19A is a perspective view illustrating the main part of the roller body.
Figure 19B:
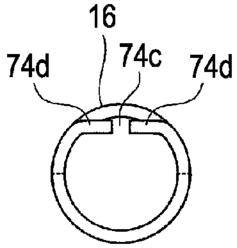
FIG. 19B is a side view thereof.

Further, as shown in FIGS. 19A and 19B, the end portion of the roller body 16 may be provided with an engagement portion 74 which includes a groove 74*a* and a D-cut portion

74*b*. In the engagement portion 74, the D-cut portion 74*b* is formed at the outer end of the roller body 16, and the groove 74*a* is formed on the inside of the D-cut portion 74*b*. As shown in FIG. 19A, the groove 74*a* is formed in a manner such that a substantially half of the roller body 16 is cut in the circumferential direction. The D-cut portion 74*b* includes an opening 74*c* which extends in the direction perpendicular to the groove 74*a* at the outside of the groove 74*a*, and includes a pair of bent pieces 74*d* and 74*d* at both sides of the opening 74*c*. That is, as shown in FIG. 19B, the pair of bent pieces 74*d* and 74*d* is bent toward the center axis of the roller body 16, so that the portion corresponding to the bent pieces 74*d* and 74*d* is recessed from the circular outer peripheral surface of the roller body 16.

Accordingly, when a connection component (not shown) such as a gear engages with the groove 74*a* or the D-cut portion 74*b*, the connection component may be attached to the roller body 16 (the transport roller 15) without a meaningless rotation with respect thereto. Further, in the engagement portion 74, by using the opening 74*c* formed between the bent pieces 74*d*, the connection component may be attached to the roller body 16 without a meaningless rotation with respect thereto. Specifically, when the connection component is provided with a convex portion, and the convex portion is fitted to the opening 74*c*, a meaningless rotation may be prevented.

Figure 20A:
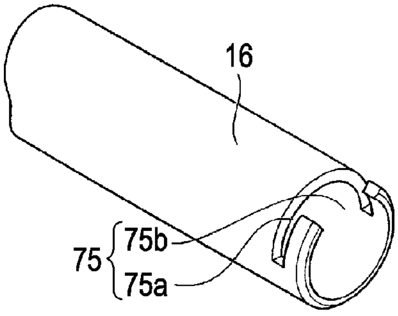
FIG. 20A is a plan view illustrating the main part of the roller body.
Figure 20B:
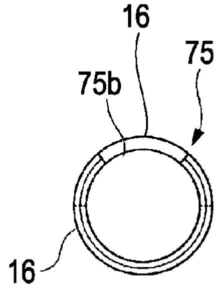
FIG. 20B is a perspective view illustrating the main part thereof.

Further, as shown in FIGS. 20A and 20B, the end portion of the roller body 16 may be provided with an engagement portion 75 which includes a groove 75*a* and an opening 75*b*. In the engagement portion 75, the opening 75*b* is formed at the outer end of the roller body 16, and the groove 75*a* is formed on the inside of the opening 75*b*. As shown in FIG. 20A, the groove 75*a* is formed in a manner such that a substantially half of the roller body 16 is cut in the circumferential direction. In the opening 75*b*, a part of the roller body 16 at the outside of the groove 75*a* is cut into a rectangular shape in the plan view, whereby as shown in FIG. 20B, the external shape at the side end surface is formed in a D-shape.

Accordingly, when a connection component (not shown) such as a gear engages with the groove 75*a* or the portion having a D-shaped external shape and formed by the opening 75*b*, the connection component may be attached to the roller body 16 (the transport roller 15) without a meaningless rotation with respect thereto. Further, even in the engagement portion 75, the connection component may be attached to the roller body 16 without a meaningless rotation with respect thereto by using the opening 75*b* as in the engagement portion 73 shown in FIGS. 18A and 18B.

In order to form the engagement hole 71 or the engagement portions 73, 74, and 75, a cutting process may be further performed on the roller body 16 which is obtained by pressing the flat sheet portion 60. However, in this case, since a separate process needs to be performed on the roller body 16 to form the engagement portion, efficiency with respect to cost or time is degraded. Therefore, in the manufacturing method of the invention, the exploded engagement portion used as the engagement portion is formed in the flat sheet portion 60 by the first pressing process before the roller body 16 is pressed in the second pressing process. Then, the engagement portion is formed at the same time when the flat sheet portion 60 is pressed by the second pressing process to be formed as the roller body 16.

Specifically, the metal sheet M wound in a coil shape is punched into the flat sheet portion 60 which has a thin and long rectangular shape. At the same time when the small flat sheet portion 60 is formed from the large metal sheet M, the end portion of the obtained flat sheet portion 60 is provided with an exploded engagement portion which has a notch shape, a protrusion shape, a hole shape, or a groove shape.

Figure 21A:
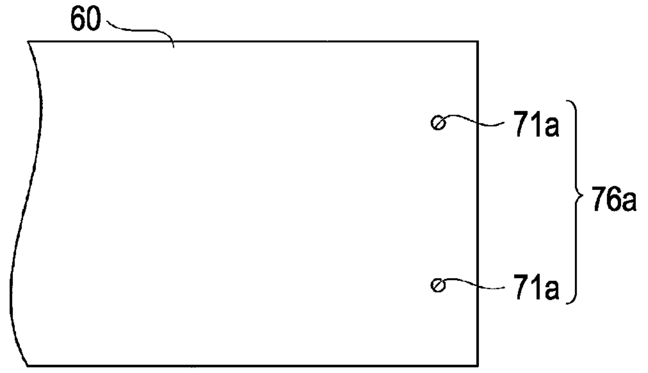
FIGS. 21A to 21D are plan views illustrating a main part of a metal sheet showing an exploded engagement portion.

For example, when the pair of penetration holes 71*a* and 71*a* is formed at a predetermined position of the end portion of the flat sheet portion 60 as shown in FIG. 21A so that they are formed as the exploded engagement portion 76*a*, the engagement hole 71 shown in FIGS. 17A and 17B may be formed in a manner such that the flat sheet portion 60 is pressed to allow the pair of penetration holes 71*a* and 71*a* to face each other.

Figure 21B:
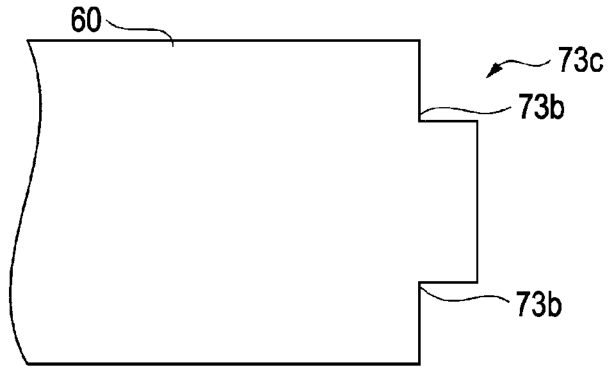

Further, when the end portion of the flat sheet portion 60 is cut into a predetermined shape as shown in FIG. 21B to form an exploded engagement portion 73*c* having a pair of notch portions 73*b* and 73*b*, the engagement portion 73 shown in FIGS. 18A and 18B may be formed by pressing the flat sheet portion 60.

Figure 21C:
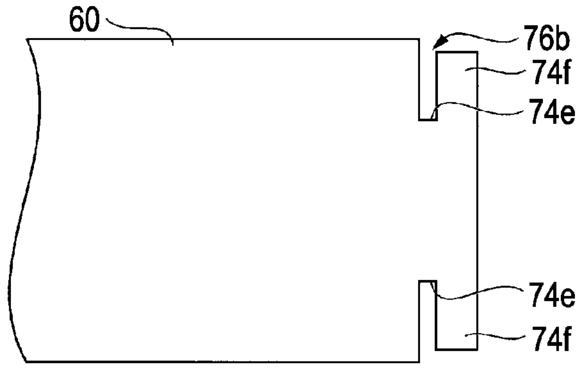

In addition, when the end portion of the flat sheet portion 60 is cut into a predetermined shape as shown in FIG. 21C so that it is used as an exploded engagement portion 76*b*, the engagement portion 74 shown in FIGS. 19A and 19B may be formed by pressing the flat sheet portion 60. That is, the engagement portion 74 may be formed by forming a pair of notch portions (concave portions) 74*e* and 74*e* and a pair of protrusions 74*f* and 74*f* as the exploded engagement portion 76*b*. However, in this example, since it is necessary to form the bent piece 74*d* by bending the pair of protrusions 74*f* and 74*f* inward after the flat sheet portion 60 is pressed, the efficiency in the cost or time with respect to the process is slightly insufficient.

Figure 21D:
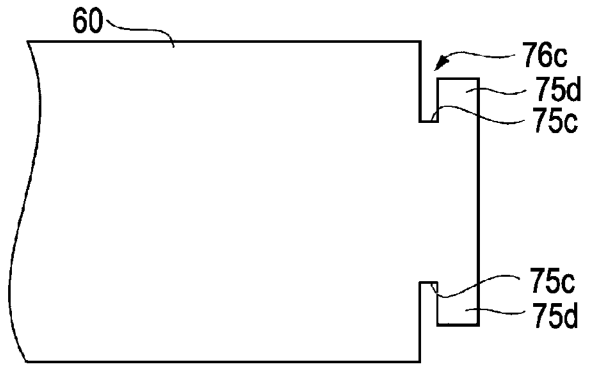

Therefore, when the end portion of the flat sheet portion 60 is cut into a predetermined shape as shown in FIG. 21D so that it is used as an exploded engagement portion 76*c*, the engagement portion 75 shown in FIGS. 20A and 20B may be formed by pressing the flat sheet portion 60. That is, the engagement portion 75 may be formed by forming a pair of notch portions (concave portions) 75*c* and 75*c* and a pair of protrusions 75*d* and 75*d* as the exploded engagement portion 76*c*. In this example, the pair of protrusions 75*d* and 75*d* is bent in a circular arc shape when the flat sheet portion 60 is pressed, whereby the opening 75*b* shown in FIG. 20B may be formed between the protrusions 75*d* and 75*d*. Accordingly, it is not necessary to further perform a process on the roller body 16 subjected to the pressing process, whereby the efficiency in the cost or time with respect to the process may be sufficiently improved.

Here, in the examples shown in FIGS. 21B to 21D, exploded engagement portions 73*c*, 76*b*, and 76*c* are formed at both end portions of the flat sheet portion 60 so that the engagement portions 73, 74, and 75 shown in FIGS. 18A to 20B are formed with the joint 80 therebetween. In this manner, when the exploded engagement portions 73*c*, 76*b*, and 76*c* are formed at both end portions, the joint 80 of the roller body 16 may be set to be shorter than the length of the roller body 16. Accordingly, when the joint 80 is formed, it is possible to prevent the roller body 16 from being deformed due to the interference caused by the partial contact between the end surfaces 61*a* and 61*b*.

Figure 22A:
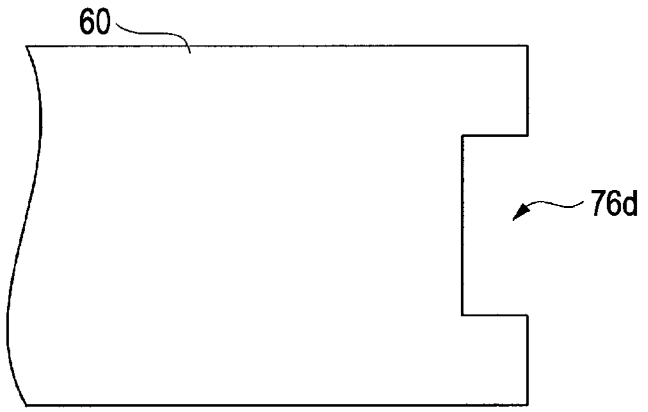
FIGS. 22A to 22C are plan views illustrating the main part of the metal sheet showing an exploded engagement portion.
Figure 22B:
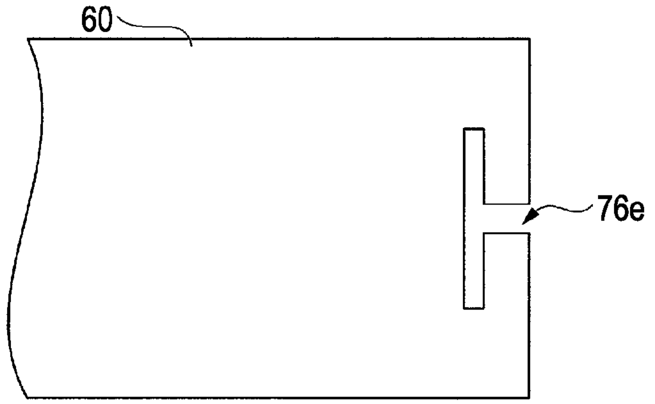
Figure 22C:
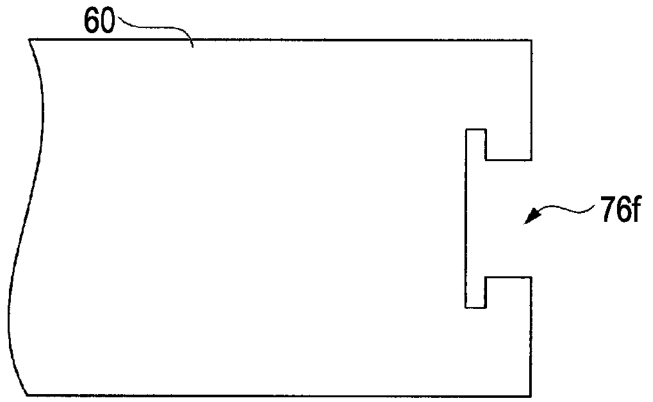

However, the invention is not limited thereto, and as shown in FIGS. 22A to 22C, the exploded engagement portion may be formed in the vicinity of the center axis of the width direction (warping direction) without forming the exploded engagement portion at both end portions of the flat sheet portion 60. That is, when the end portion is provided with an exploded engagement portion 76*d* which is formed as a thin and long rectangular notch as shown in FIG. 22A, the engagement portion 73 may be formed as shown in FIGS. 18A and 18B. Further, when an exploded engagement portion 76*e* having a T-shaped notch is formed as shown in FIG. 22B, the engagement portion 74 may be formed as shown in FIGS. 19A and 19B. Further, when an exploded engagement portion 76*f* having a T-shaped notch is formed as shown in FIG. 22C, the engagement portion 75 may be formed as shown in FIGS. 20A and 20B.

In this manner, when the exploded engagement portions 76*d* to 76*f* are formed in the vicinity of the center axis in the warping direction, the engagement portions 73 to 75 may be more precisely formed from the exploded engagement portions 76*d* to 76*f*.

As described above, in the method of manufacturing the transport roller 15 of the embodiment, the exploded engagement portion is formed at the same time when the small metal sheet (the first metal sheet) 60 is formed from the large metal sheet (the second metal sheet) M by a pressing process. Further, the engagement portions 71, 73, 74, and 75 are formed from the exploded engagement portion at the same time when the metal sheet (the first metal sheet) 60 is pressed. Accordingly, after the roller body 16 is formed, it is not necessary to further perform a separate process for forming the engagement portion.

Accordingly, since the cost or time necessary for the separate process is not necessary, the manufacturing cost of the transport roller 15 may be sufficiently reduced, and the productivity may be improved. In particular, since the exploded engagement portion is integrally formed by making a large metal sheet into a small metal sheet, the process may be further simplified.

Furthermore, as shown in FIG. 11A, in the transport roller 15 (the roller body 16) according to the embodiment, the joint 80 is formed to be parallel to the center axis of the roller body 16 formed as a cylindrical hollow pipe, but the invention is not limited thereto. For example, the joint formed between the pair of end portions of the flat sheet portion 60 as the base material may be formed to be partially overlapped with one or plural points on a line parallel to the center axis of the cylindrical pipe (the roller body) at the outer peripheral surface of the cylindrical pipe instead of allowing the joint to be entirely overlapped with the line.

Figure 23A:
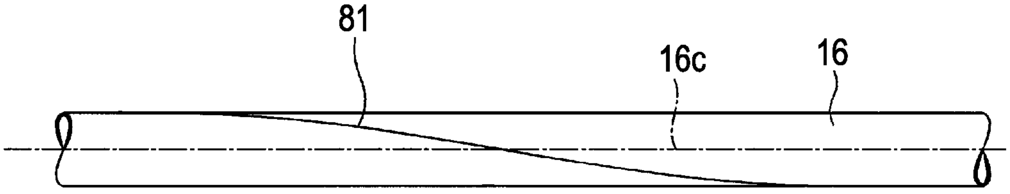
FIGS. 23A and 23C are diagrams illustrating the joint.
Figure 23B:
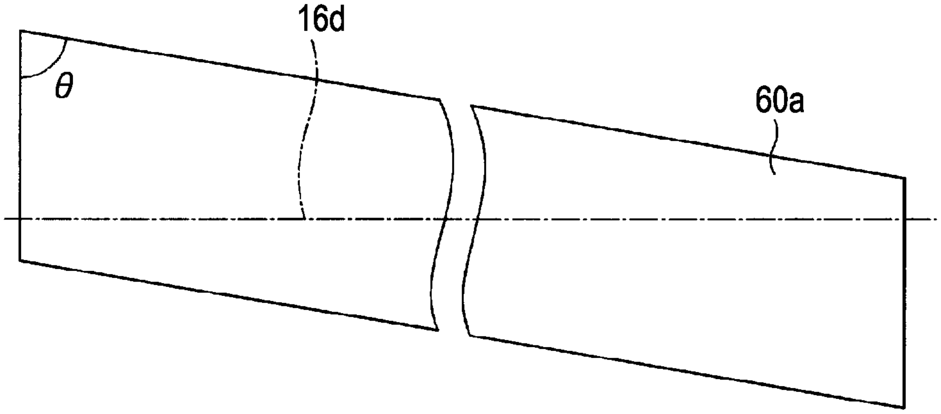
FIG. 23B is a plan view illustrating the metal sheet.

Specifically, as shown in FIG. 23A, the joint 81 may be formed to extend from one end of the roller body 16 to the other end thereof while extending in the circumferential direction of the outer peripheral surface of the roller body 16 so as to intersect the center axis 16*c* of the roller body 16 instead of being parallel to the center axis 16*c*. In order to form the joint 81 in this manner, a flat sheet portion 60*a* having a thin and long parallelogram shape is formed as shown in FIG. 23B instead of the flat sheet portion 60 having a thin and long rectangular shape as the base material of the metal sheet, and then a pressing process is performed so that the line indicated by the reference numeral 16*d* is aligned with the center axis. Accordingly, the roller body 16 shown in FIG. 23A is obtained, and the joint 81 is not parallel to the center axis 16*c*.

Figure 23C:
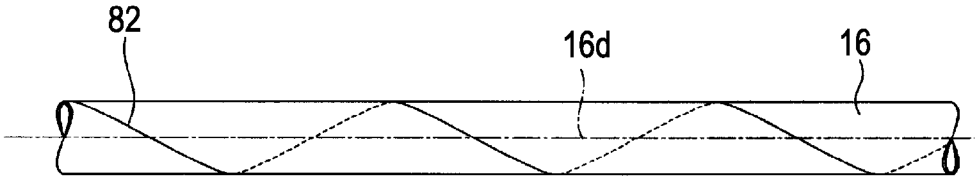

Furthermore, in the roller body 16 shown in FIG. 23A, the joint 81 is formed from one end of the roller body 16 to the other end thereof so that it is formed on the circumferential surface less than one round. This configuration is used to facilitate the pressing process of the flat sheet portion 60*a*. However, as shown in FIG. 23C, the joint 82 may be formed from one end of the roller body 16 to the other end thereof so that it is formed around the circumferential surface one round or more, that is, it is formed in a spiral shape. In this case, as for the metal sheet as the base material, the angle θ at the flat sheet portion 60*a* having a thin and long parallelogram shape shown in FIG. 23B may become an angle which is acuter than the angle θ.

Figure 24A:
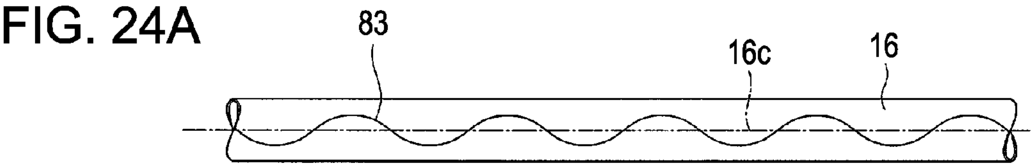
FIG. 24A is a diagram illustrating the joint of the roller body.
Figure 24B:
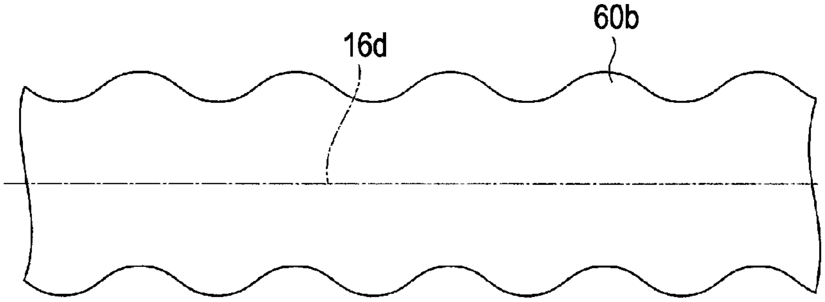
FIG. 24B is a plan view illustrating the metal sheet.

Further, as shown in FIG. 24A, the joint 83 may be formed in a waveform shape having a curve such as a sine wave. In order to form the joint 83 in this manner, a flat sheet portion 60*b* having both long sides each formed as a wavy line is used as the metal sheet as the base material as shown in FIG. 24B, and then a pressing process is performed so that the line indicated by the reference numeral 16*d* is aligned with the center axis. Furthermore, since the pair of long sides each formed in a wavy line shape is made to be close to each other by a pressing process, of course, when one long side is formed as a mountain portion between the corresponding positions, the other long side is formed as a valley portion. On the contrary, when one long side is formed as a valley portion, the other long side is formed as a mountain portion. Further, in this example, it is formed so that the center axis of the joint 83 is parallel to the center axis of the roller body 16, the center axis of the joint 83 may be formed so as not to be parallel to the center axis of the roller body 16. In this case, as for the metal sheet as the base material, the metal sheet a thin and long parallelogram shape shown in FIG. 23B may be used, or the metal sheet having both long sides each formed in a wavy line shape may be used.

Figure 25A:
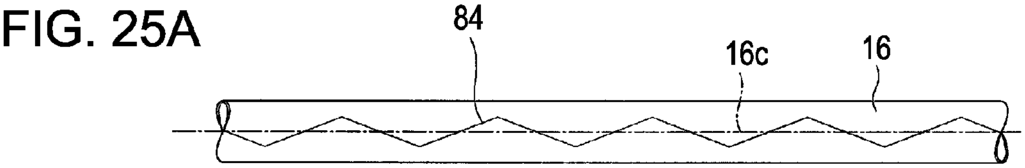
FIG. 25A is a diagram illustrating the joint of the roller body.
Figure 25B:
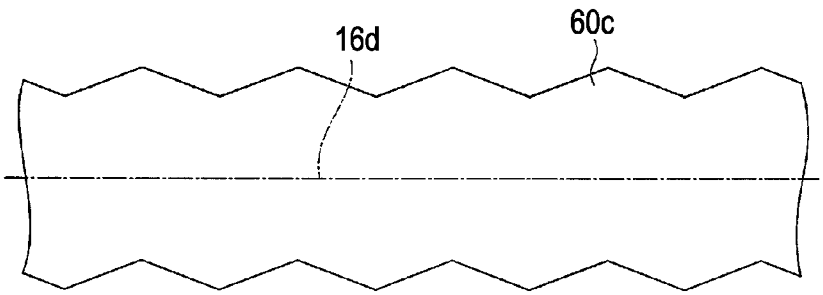
FIG. 25B is a plan view illustrating the metal sheet.

Further, as shown in FIG. 25A, the joint 84 may be formed in a wavy line shape that is bent in a hook shape. In order to form the joint 84 in this manner, a flat sheet portion 60*c* having a substantially thin and long rectangular shape and both long sides each formed in a wavy line shape bent in a hook shape shown in FIG. 23B is used as the metal sheet as the base material, and then a pressing process is performed so that the line indicated by the reference numeral 16*d* is aligned with the center axis.

Even in the flat sheet portion 60*c*, when one long side is formed as a mountain portion between the corresponding positions in a pair of long sides each formed in a wavy line shape, the other long side is formed in a valley shape. On the contrary, when one long side is formed in a valley shape, the other long side is formed in a mountain shape. Furthermore, even in this example, the center axis of the joint 84 is set to be parallel to the center axis of the roller body 16, but may not be parallel to the center axis of the roller body 16 as in the case of the joint 83.

Further, the joint is not limited to the examples shown in FIGS. 23A to 25B, but may be formed in various shapes. For example, the curved dashed line shown in FIG. 24A and the bent dashed line shown in FIG. 25A may be used in combination, and the line having an inclination shown in FIGS. 23A to 23C may be used in combination.

In this manner, the joints 81 to 84 are formed to be partially overlapped with one or plural points on the line parallel to the center axis of the cylindrical pipe (the roller body 16) instead of allowing the joints to be entirely overlapped with the line. Accordingly, when the transport roller 15 including the roller body 16 transports the sheet P together with the driven roller 17, that is, the sheet is fed, the transport speed of the sheet P becomes constant, and the transport irregularity is more reliably prevented.

Figure 26:
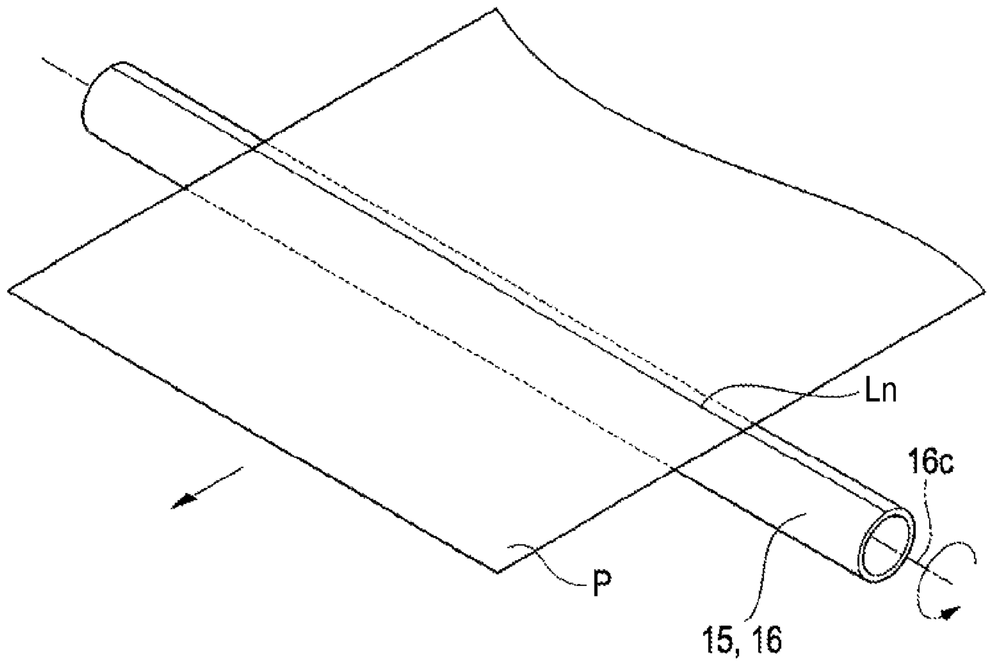
FIG. 26 is a perspective view illustrating a relationship between a sheet and a transport roller when the sheet is transported.

That is, as shown in FIG. 26, the position contacting the sheet P when the sheet is fed by the transport roller 15 is basically set to the line on the outer peripheral surface thereof, that is, the line Ln parallel to the center axis 16*c*. Accordingly, as shown in FIG. 7B, when the joint 80 of the transport roller 15 (the roller body 16) is parallel to the center axis 16*c* of the roller body 16, the entire joint 80 of the transport roller 15 temporarily (momentarily) contacts the sheet P. Then, since the groove is not formed in the transport roller 15 of the embodiment due to the joint 80 as described above, any problem occurs. However, if the groove is formed by the joint 80, the groove temporarily and simultaneously contacts the sheet P, whereby the entire width of the sheet P temporarily contacts the groove formed by the joint 80. As a result, since the groove is more depressed than the other outer peripheral surface of the transport roller 15, and the contact resistance with respect to the sheet P is small, the transport speed of the sheet P is temporarily reduced, and the transport irregularity occurs.

However, in the joints 81 to 84 formed as shown in FIGS. 23A, 23C, 24A, and 25A, even when the groove is formed by the joint, the position contacting the sheet P in the groove may be one or plural points. Accordingly, there is almost no variation in the contact resistance compared to the case of contacting the other surface (line) of the transport roller 15, whereby the transport speed of the sheet P becomes constant, and the transport irregularity is prevented.

Figure 27A:
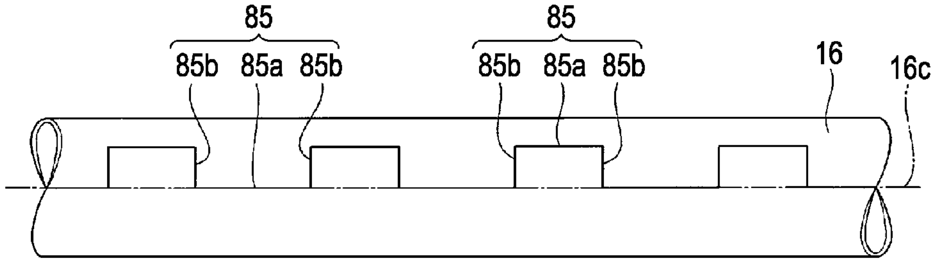
FIGS. 27A to 27C are diagrams illustrating the shape of the joint.

Further, regarding the joint of the transport roller 15 (the roller body 16) formed as the cylindrical hollow pipe, in addition to the above-described example, for example, as shown in FIG. 27A, the joint may include a bent portion 85 which is formed in a rectangular wave shape and includes a linear portion 85*a* parallel to the center axis of the roller body 16 and a linear portion 85*b* perpendicular thereto. Even in the joint including the bent portion 85, if the groove is formed by the joint, the groove does not simultaneously contact the entire width of the sheet P when the sheet is fed, whereby the transport speed of the sheet P becomes almost constant, and the transport irregularity is prevented.

Figure 27B:
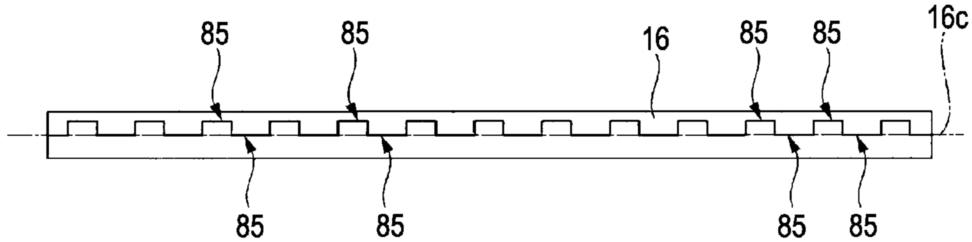
Figure 27C:
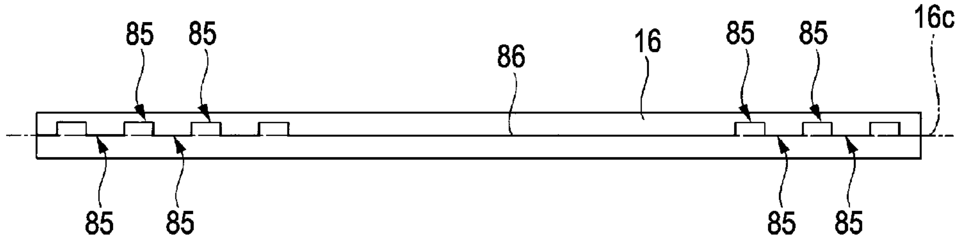

Further, the bent portion 85 may be formed throughout the entire length of the roller body 16 as shown in FIG. 27B, or may be selectively formed at both end portions except for the center portion as shown in FIG. 27C. When the bent portion 85 is formed only at both end portions as shown in FIG. 27C, a center linear portion 86 is formed between the bent portions 85 so as to be parallel to the center axis of the roller body 16. However, although it is not shown in the drawings, the center linear portion between the bent portions 85 may be formed as a slanted line that is not parallel to the center axis 16*c* as shown in FIG. 23A.

Further, in this manner, when the bent portion 85 is formed only at both end portions and the center linear portion 86 is formed therebetween, it is desirable that the formation area of the high friction layer 50 shown in FIG. 12C corresponds to the center linear portion 86.

When the joint is provided with the bent portion 85 so that the bent portion 85 is used as a fitting portion using its uneven portion, it is difficult to perform the fitting operation at the bent portion 85 (fitting portion) so that the convex portion moves close to (abuts on) the corresponding concave portion without any gap therebetween. Accordingly, when the bent portion 85 is formed throughout the entire length of the roller body 16, distortion or skewness easily occurs in the roller body 16. Therefore, as shown in FIG. 27C, when the bent portion 85 is formed only at both end portions, such distortion or skewness may be suppressed. Further, particularly, since the center portion corresponding to the high friction layer 50 serving as the area directly contacting the sheet P is formed as the center linear portion 86 instead of the bent portion 85, distortion or skewness may be reliably prevented from occurring in the area directly contacting the sheet P.

Figure 28A:
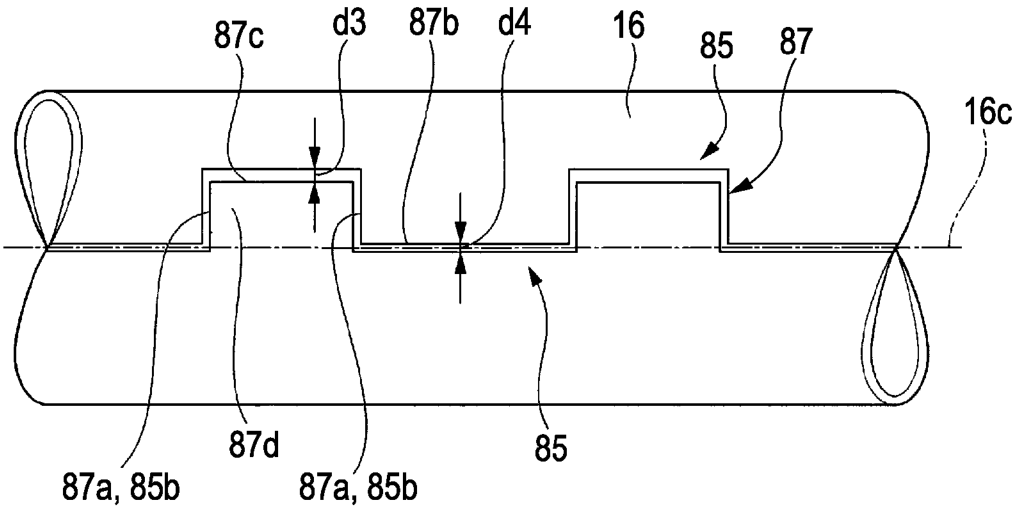
FIG. 28A is an explanatory diagram illustrating the shape of the joint.

Further, when the bent portion 85 is formed throughout the entire length of the roller body 16 as shown in FIG. 27B, the joint 87 including the bent portion 85 may include plural interconnection portions 87*a* having the linear portion 85*b*, a first linear portion 87*b* connecting one end portions of the interconnection portions 87*a*, and a second linear portion 87*c* connecting the other end portions thereof as shown in FIG. 28A. Here, the first linear portion 87*b* and the second linear portion 87*c* are formed to be substantially parallel to the center axis of the roller body 16, and the intersection portion 87*a* is formed to be perpendicular to the first linear portion 87*b* and the second linear portion 87*c*, that is, to intersect the center axis of the roller body 16. Further, the second linear portion 87*c* is formed to be shorter than the first linear portion 87*b*.

When the joint 87 having such a configuration is formed, particularly, it is desirable that the distance d3 between the pair of facing end portions of the second linear portion 87*c* is set to be longer than the distance d4 between the pair of facing end portions in the first linear portion 87*b*. Furthermore, the distances d3 and d4 between the pair of end portions mentioned herein are both set as the distance between end portions at the gap formed at the outer peripheral surface of the roller body 16.

With such a configuration, the precision in the shape or the dimension of the cylindrical hollow pipe of the roller body 16 may be more improved, whereby the transport irregularity caused by the deformation of the roller body 16 may be prevented. That is, in the metal sheet as the base material forming the roller body 16, one end portion forming the second linear portion 87*c* is formed as a convex piece 87*d* having an external shape formed by the pair of intersection portions 87*a* and 87*a* adjacent to each other and the second linear portion 87*c* connecting them to each other. Accordingly, when the metal sheet is pressed so that the convex piece 87*d* is made to be close to the facing end portion, as depicted by the two-dotted chain line in FIG. 28B, the front end side of the convex piece 87*d* is not sufficiently warped in a cylindrical surface shape, and is floated from the facing end portion by the dimension t1, whereby a step is formed in the second linear portion 87*c*. Then, deformation or the like easily occurs in the roller body 16 due to the step, and the satisfactory precision in the shape or the dimension is difficult to be obtained.

Figure 28B:
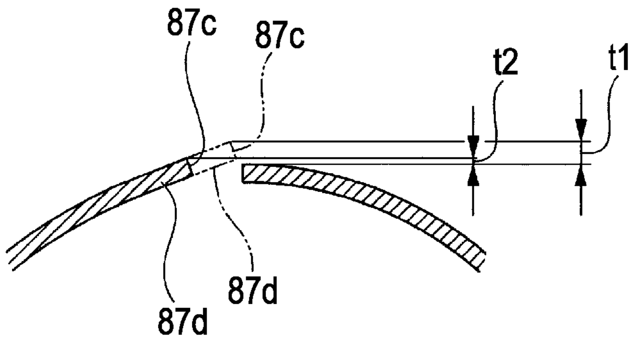
FIG. 28B is an explanatory diagram illustrating the operation thereof.

Therefore, when the distance d3 between the end portions at the second linear portion 87*c* is set to be longer than the distance d4 between the end portions at the first linear portion 87*b* longer than the second linear portion 87*c*, as depicted by the solid line of FIG. 28B, the dimension t2 indicating the floated state of the front end side of the convex piece 87*d* becomes smaller than the dimension t1, whereby a step may be suppressed from being formed in the second linear portion 87*c*.

Furthermore, in FIG. 28B, the dimension t2 is depicted to be large for easy understanding, but in fact, the dimension t2 is almost zero, whereby the substantial step is removed. That is, in this manner, when the step is suppressed from being formed in the second linear portion 87*c*, deformation or the like of the roller body 16 caused by the step may be suppressed, and the precision in the shape or the dimension may be improved.

Figure 29:
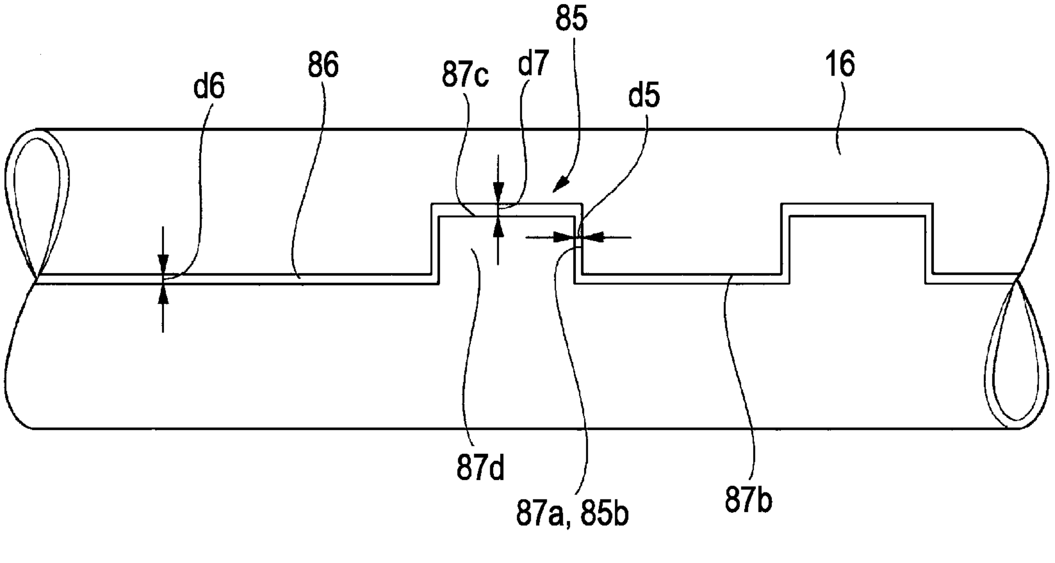
FIG. 29 is a diagram illustrating the shape of the joint.

Further, when the bent portion 85 is formed at both end portions of the roller body 16 as shown in FIG. 27C, it is desirable that the distance d5 between the pair of facing end portions in the intersection portion 87*a* (the linear portion 85*b*) of the bent portion 85 is shorter than the distance d6 between the pair of facing end portions in the center linear portion 86 as shown in FIG. 29.

With such a configuration, since the distance d5 is relatively short so that the gap between the end portions at the intersection portion 87*a* is very narrow, a deviation in the length direction (axial direction) between one end portion and the other end portion is regulated by the pair of facing end portions forming the intersection portion 87*a* when pressing the metal sheet as the base material forming the roller body 16. Accordingly, distortion or skewness is difficult to occur in the roller body 16 (the transport roller 15), whereby the transport irregularity caused by distortion or skewness may be prevented.

Furthermore, when the bent portion 85 is formed at only both end portions of the roller body 16 as shown in FIG. 27C, it is desirable that the distance d7 between the pair of facing end portions in the second linear portion 87*c* forming the convex piece 87*d* of the bent portion 85 is shorter or longer than the distance d6 between the pair of facing end portions in the center linear portion 86 as shown in FIG. 29.

When the distance d7 is shorter than the distance d6, the gap is more easily and uniformly formed between the pair of facing end portions when the joint is seen from the entire length thereof, whereby the precision in the shape or the dimension of the roller body 16 is improved. That is, the length of the center linear portion 86 becomes longer than the length of the second linear portion 87*c* of the bent portion 85, whereby the pair of end portions in the center linear portion 86 may be made to be close to each other with high precision compared to the second linear portion 87*c*. Accordingly, even when the distance between the pair of end portions at the center linear portion 86 capable of obtaining the relatively satisfactory precision is set to be longer than that of the second linear portion 87*c* so that the gap thereof is enlarged, the gap may be sufficiently uniformly formed, whereby the transport irregularity caused by distortion or skewness of the roller body 16 may be prevented.

On the other hand, when the distance d7 is longer than the distance d6, as shown in FIG. 28B, the floated dimension t2 at the front end side of the convex piece 87*d* becomes smaller, whereby the step is suppressed from being formed in the second linear portion 87*c*. Accordingly, since the step is suppressed from being formed in the second linear portion 87*c* in this manner, deformation or the like caused by the roller body 16 is suppressed, and the precision in the shape or the dimension is improved, whereby the transport irregularity is prevented.

Figure 30A:
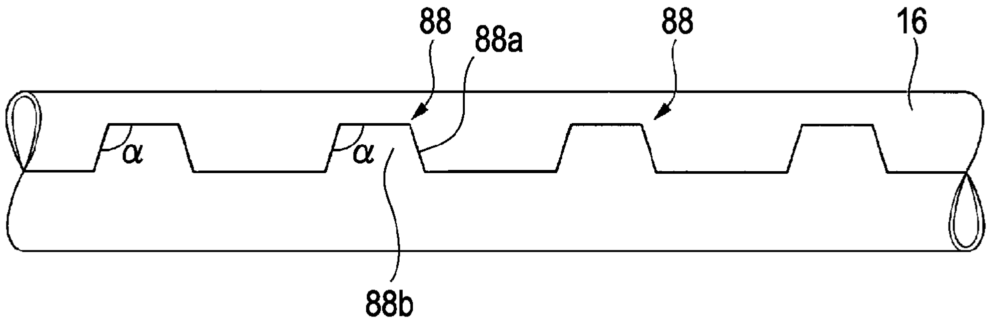
FIGS. 30A to 30C are diagrams illustrating the shape of the joint.

Furthermore, the joint of the transport roller 15 (the roller body 16) formed as the cylindrical hollow pipe is not limited to the above-described example, and may be formed, for example, in a manner such that an intersection portion 88*a* of a bent portion 88 is set to be not parallel to the center axis of the roller body 16 as shown in FIG. 30A, and an angle α at a front end side of a convex piece 88*b* of a bent portion 88 is an obtuse angle (less than 180'). With such a configuration, when the pair of end surfaces is made to be close to each other by pressing the metal sheet, the front end of the convex piece 88*b* may be easily fitted to the corresponding concave portion, whereby distortion or skewness of the roller body 16 may be suppressed.

Figure 30B:
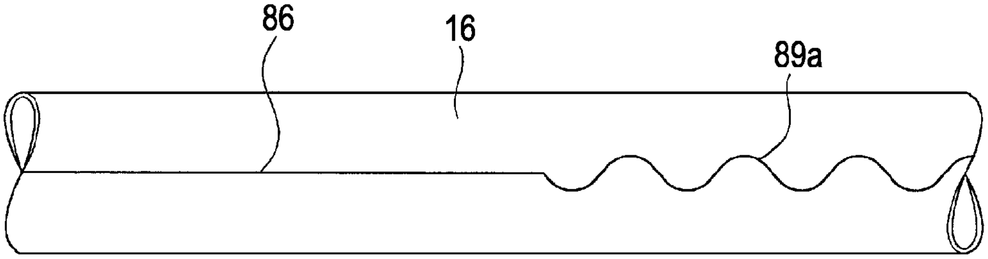

Further, in the structure in which the bent portion 85 is formed only at both end portions as shown in FIG. 27C, for example, as shown in FIG. 30B, the bent portion 85 may be replaced with a wavy line 89*a* having a curve shown in FIG. 24A. Alternatively, for example, as shown in FIG. 30C, the bent portion may be replaced with a bent wavy line 89*b* shown in FIG. 25A.

Figure 30C:
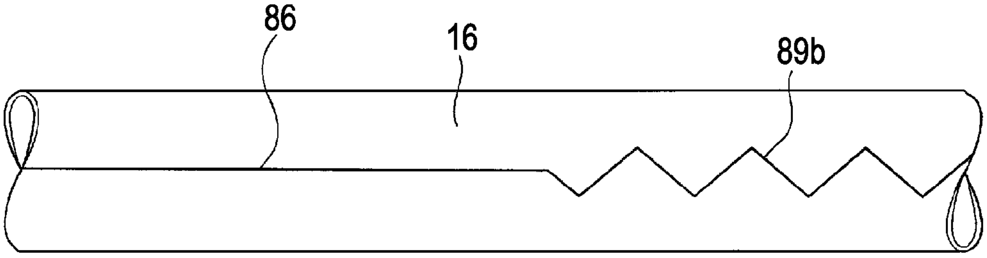

Further, the joint may be formed by the combination of the bent portion 85 having a rectangular wave shape shown in FIG. 27A and the wavy line 89*a* having the curve shown in FIG. 30B, or may be formed by the combination of the bent portion 85 having the rectangular wave shape and the bent wavy line 89*b* shown in FIG. 30C.

Further, hereinafter, an example of the spot welding portion SP will be described.

In the above-described embodiment, an example has been described in which the spot welding portion SP is formed in the roller body 16 having the linear joint 80, but the invention is not limited thereto. For example, the spot welding portion SP may be appropriately formed in, for example, the joints 80 having the above-described respective shapes instead of the linear joint 80.

Figure 31:
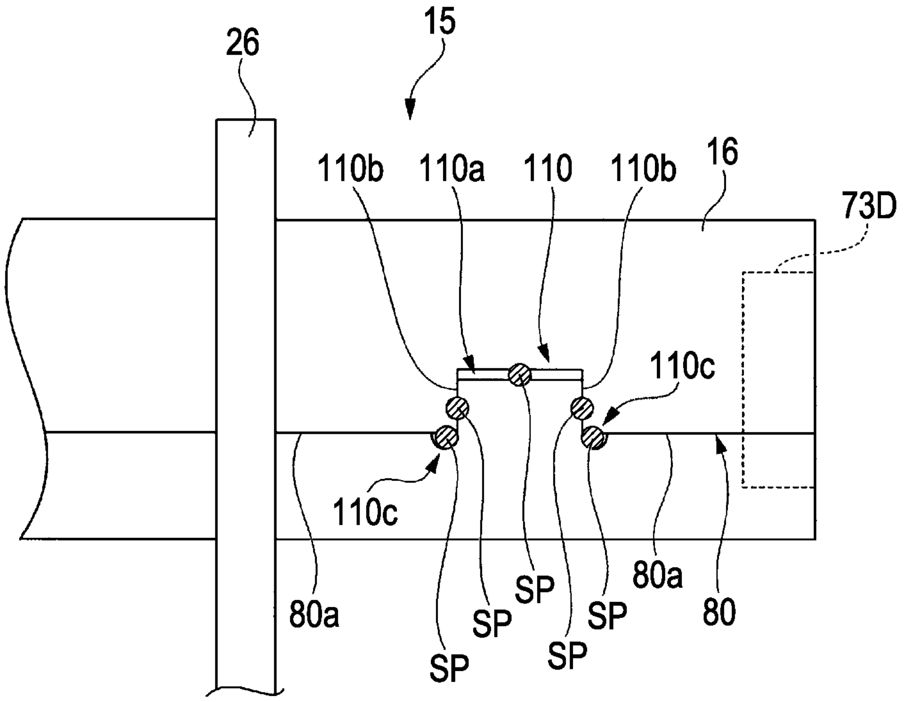
FIG. 31 is a diagram illustrating the joint of the roller body.

Further, for example, as shown in FIG. 31, in the roller body 16 of the transport roller 15 having the end portion provided with the connection portion 73D connected to the rotational driving unit, it is desirable that the spot welding portion SP is formed in the vicinity of the connection portion 73D (for example, between the connection portion 73D and the bearing 26).

Further, for example, even when the joint 80 is provided with an uneven portion 110, the invention may be applied thereto. As shown in FIG. 31, the uneven portion 110 is formed in a rectangular shape so that one end portion 61*a* of the metal sheet M is fitted to the other end portion 61*b* thereof. The uneven portion 110 includes, for example, a first side 110*a* which is formed along the rotation axis direction of the roller body 16 and a pair of second sides 110*b* which is formed along the circumferential direction of the roller body 16.

In this case, it is desirable that the spot welding portion SP is formed, for example, at least one of the first side 110*a* and the second side 110*b*. For example, when the first side 110*a* is provided with the spot welding portion SP, for example, the strength of the uneven portion 110 with respect to the force in the circumferential direction of the roller body 16 is improved. For this reason, for example, the uneven portion 110 may be prevented from being opened in the circumferential direction and being depressed inward.

Further, when the second side 110*b* is provided with the spot welding portion SP, the spot welding portion may be easily formed since the formation position may be easily positioned. Of course, even when the second side 110*b* is provided with the spot welding portion SP, the strength with respect to the force in the circumferential direction of the roller body 16 may be improved. Further, all of the first side 110*a* and the second side 110*b* may be provided with the spot welding portion.

Further, the spot welding portion SP may be provided at a boundary portion 110*c* between the linear portion 80*a* of the joint 80 and the uneven portion 110. For example, the boundary portion 110*c* easily receives a force from the uneven portion 110. For this reason, since the strength of the boundary portion 110*c* is improved by providing the spot welding portion SP, deformation of the uneven portion 110 may be more reliably prevented.

Furthermore, in FIG. 31, an example has been described in which the uneven portion 110 is disposed between, for example, the connection portion 73D and the bearing 26, but the invention is not, of course, limited thereto. For example, even when the uneven portion 110 is formed to be closer to the high friction layer 50 than the bearing 26, as described above, the uneven portion 110 may be appropriately provided with the spot welding portion SP.

Figure 32A:
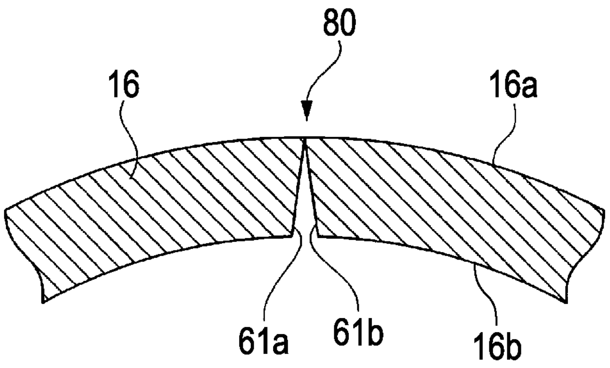
FIGS. 32A and 32B are diagrams illustrating a spot welding process.

Further, when the metal sheet M is pressed to be formed in a cylindrical shape, as shown in FIG. 32A, the metal sheet M may be formed so that one end portion 61*a* and the other end portion 61*b* of the metal sheet M come into contact with each other at the side of the outer surface 16*a* of the roller body 16.

Figure 32B:
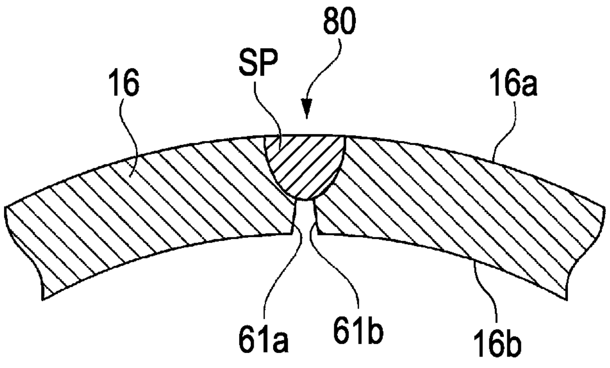

In this case, as shown in FIG. 32B, since the spot welding portion SP is formed by applying energy such as a laser beam from the outer surface 16*a* of the roller body 16, the finished state of the spot welding portion SP becomes satisfactory when they come into contact with each other at the side of the outer surface 16*a*.

What is claimed is:

1. A transport apparatus comprising:

a transport roller includes a cylindrical shaft that has a joint, the joint extending between the one axial end of the cylindrical shaft and the other axial end of the cylindrical shaft, the joint being provided with a spot welding portion, the transport roller including a high friction layer that includes resinous particles formed on a surface thereof to transport a recording medium, the spot welding portion being spaced apart from the high friction layer; and a support portion which supports a portion deviated from the high friction layer of the transport roller so that the transport roller rotates in the circumferential direction.

2. The transport apparatus according to claim 1, wherein the spot welding portion is provided to be closer to an end portion of the transport roller, in the rotation axis direction of the transport roller, than the support portion.

3. The transport apparatus according to claim 1, wherein the transport roller has a connection portion which is formed at the end portion of the rotation axis direction to be connected to a rotation driving portion rotating the transport roller, and the spot welding portion is provided in the vicinity of the connection portion.

4. The transport apparatus according to claim 1, wherein the spot welding portion is provided between the support portion and the high friction layer.

5. The transport apparatus according to claim 1, further comprising:

a driven roller which rotates accompanied by the rotation of the transport roller while pressing the transport roller and nips the recording medium between the transport roller and the driven roller, wherein the spot welding portion is provided in a portion which is deviated from a portion pressed by the driven roller and the transport roller.

6. The transport apparatus according to claim 1, wherein the pair of facing end portions forming the joint has an uneven portion which allows one facing end portion of the pair of facing end portions and the other facing end portion of the pair of facing end portions to be fitted to each other, and the spot welding portion is provided in the uneven portion.

7. The transport apparatus according to claim 6, wherein the uneven portion has a first side which is formed along the rotation axis direction of the transport roller, and the spot welding portion is provided in the first side.

8. The transport apparatus according to claim 6, wherein the uneven portion has a second side which is formed along the circumferential direction of the transport roller, and the spot welding portion is provided in the second side.

9. The transport apparatus according to claim 6, wherein the joint is provided with a linear portion which is connected to the uneven portion, and the spot welding portion is provided at a boundary portion between the linear portion and the uneven portion.

10. The transport apparatus according to claim 6, wherein the uneven portion is disposed to be closer to the end portion of the rotation axis direction of the transport roller than the support portion.

11. The transport apparatus according to claim 1, wherein the spot welding portion is a portion which is formed by fusing a part of the metal sheet.

12. The transport apparatus according to claim 11, wherein the spot welding portion is a portion which is formed by emitting a laser beam to a part of the metal sheet.

13. A recording apparatus comprising:

a transport unit which uses the transport apparatus according to claim 1 to transport a recording medium; and a recording unit which performs a recording process on the recording medium transported by the transport apparatus.

* * * * *